(12) United States Patent
Anderson

(10) Patent No.: US 7,001,506 B2
(45) Date of Patent: Feb. 21, 2006

(54) SELF-CLEANING CIRCULATIN SYSTEM AND METHOD

(76) Inventor: Ronald L. Anderson, 17211 Windy Pine Cir., Spring, TX (US) 77379

( * ) Notice: Subject to any disclaimer, the term of this patent is extended or adjusted under 35 U.S.C. 154(b) by 170 days.

(21) Appl. No.: 10/640,903

(22) Filed: Aug. 14, 2003

(65) Prior Publication Data

US 2004/0112806 A1    Jun. 17, 2004

Related U.S. Application Data

(60) Provisional application No. 60/433,852, filed on Dec. 16, 2002.

(51) Int. Cl.
*B01D 29/66* (2006.01)

(52) U.S. Cl. ............... 210/106; 210/107; 210/247; 210/354; 210/409; 210/413; 210/414

(58) Field of Classification Search ........... 210/106, 210/108, 109, 159, 169, 198.1, 241, 247, 210/408–414, 425–427, 107, 354–356
See application file for complete search history.

(56) References Cited

U.S. PATENT DOCUMENTS

| | | | | |
|---|---|---|---|---|
| 1,331,900 | A | * | 2/1920 | Cartwright ............ 210/408 |
| 1,345,531 | A | * | 7/1920 | Cartwright ............ 210/241 |
| 2,608,910 | A | | 9/1952 | McCrystle ............... 92/20 |
| 2,889,048 | A | | 6/1959 | Nordin ................ 210/409 |
| 3,112,263 | A | | 11/1963 | Ellila ................. 210/411 |
| 4,162,219 | A | | 7/1979 | Miropolsky et al. ...... 210/108 |
| 4,265,751 | A | | 5/1981 | Willinger .............. 210/169 |
| 4,431,541 | A | | 2/1984 | Lee .................... 210/393 |
| 4,449,897 | A | | 5/1984 | Garrett ................ 417/437 |
| 4,624,785 | A | * | 11/1986 | Drori .................. 210/414 |
| 5,156,749 | A | * | 10/1992 | Williams ............... 210/770 |
| 5,259,955 | A | | 11/1993 | Bolton ................. 210/406 |
| 5,268,095 | A | | 12/1993 | Barzuza ................ 210/143 |
| 5,356,541 | A | | 10/1994 | Wickzell ............... 210/791 |
| 5,374,360 | A | | 12/1994 | Weis ................... 210/780 |
| 5,538,406 | A | | 7/1996 | Siegal et al. .......... 417/360 |
| 5,573,671 | A | | 11/1996 | Klein .................. 210/617 |
| 5,575,913 | A | | 11/1996 | Sharkey ................ 210/409 |
| 5,672,281 | A | | 9/1997 | Burns et al. ........... 210/744 |
| 5,876,612 | A | | 3/1999 | Astrom ................. 210/741 |
| 5,945,005 | A | | 8/1999 | Junius et al. .......... 210/786 |
| 6,110,389 | A | | 8/2000 | Horowitz ............... 210/794 |
| 6,354,442 | B1 | | 3/2002 | Obst ................... 210/353 |
| 6,463,943 | B1 | | 10/2002 | Monroe ................. 134/152 |

OTHER PUBLICATIONS

PCT International Search Report, dated Apr. 13, 2004, for application serial no. PCT/US03/37566.

* cited by examiner

*Primary Examiner*—Joseph Drodge
(74) *Attorney, Agent, or Firm*—Kenneth L. Nash

(57) ABSTRACT

The present invention provides a system and method for providing a self-cleaning water circulation system which may be utilized for a fish pond, fountain, or the like. Means for automatically cleaning the pump intake to avoid pump failure due to leaves and debris is provided. The circulation system also comprises a self-cleaning filter for cleaning the circulated water whereby maintenance requirements are substantially reduced.

21 Claims, 24 Drawing Sheets

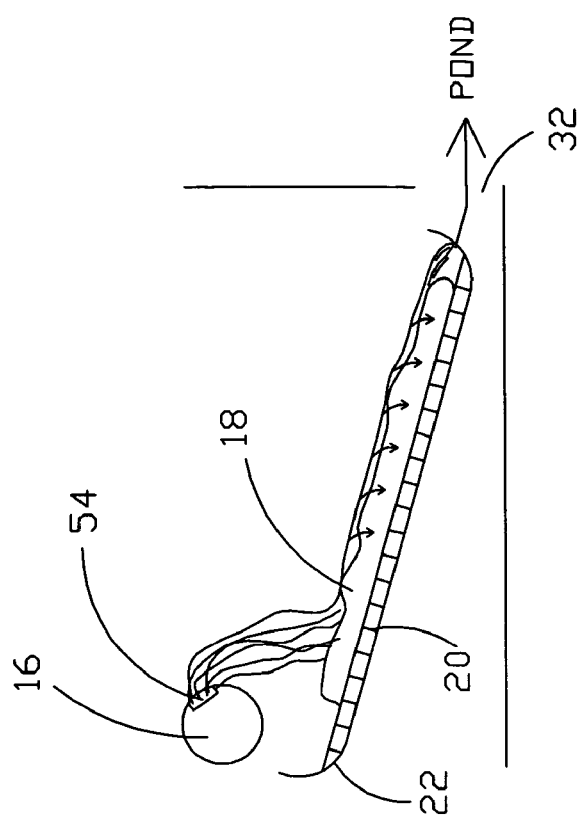
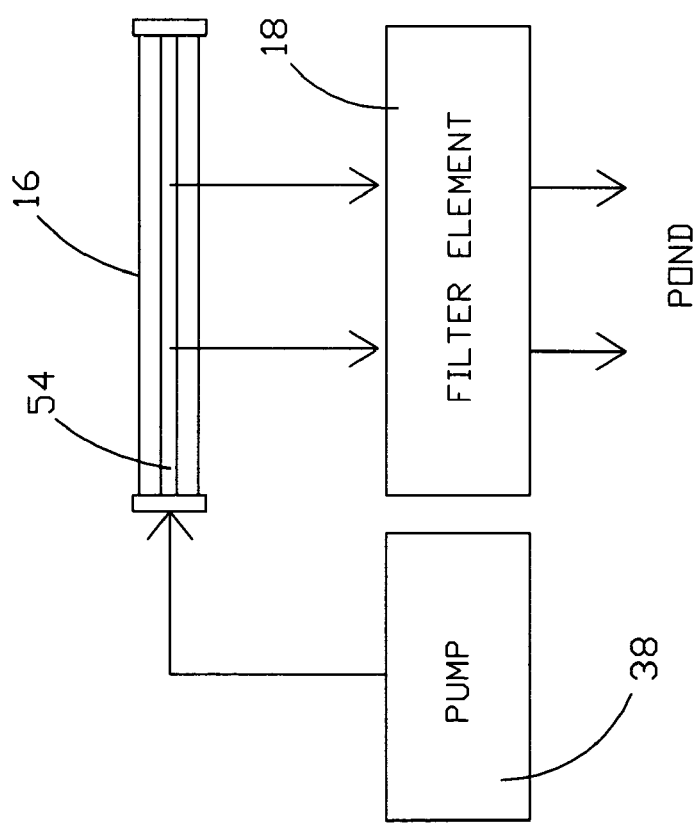
FIG. 5B
FIG. 5A

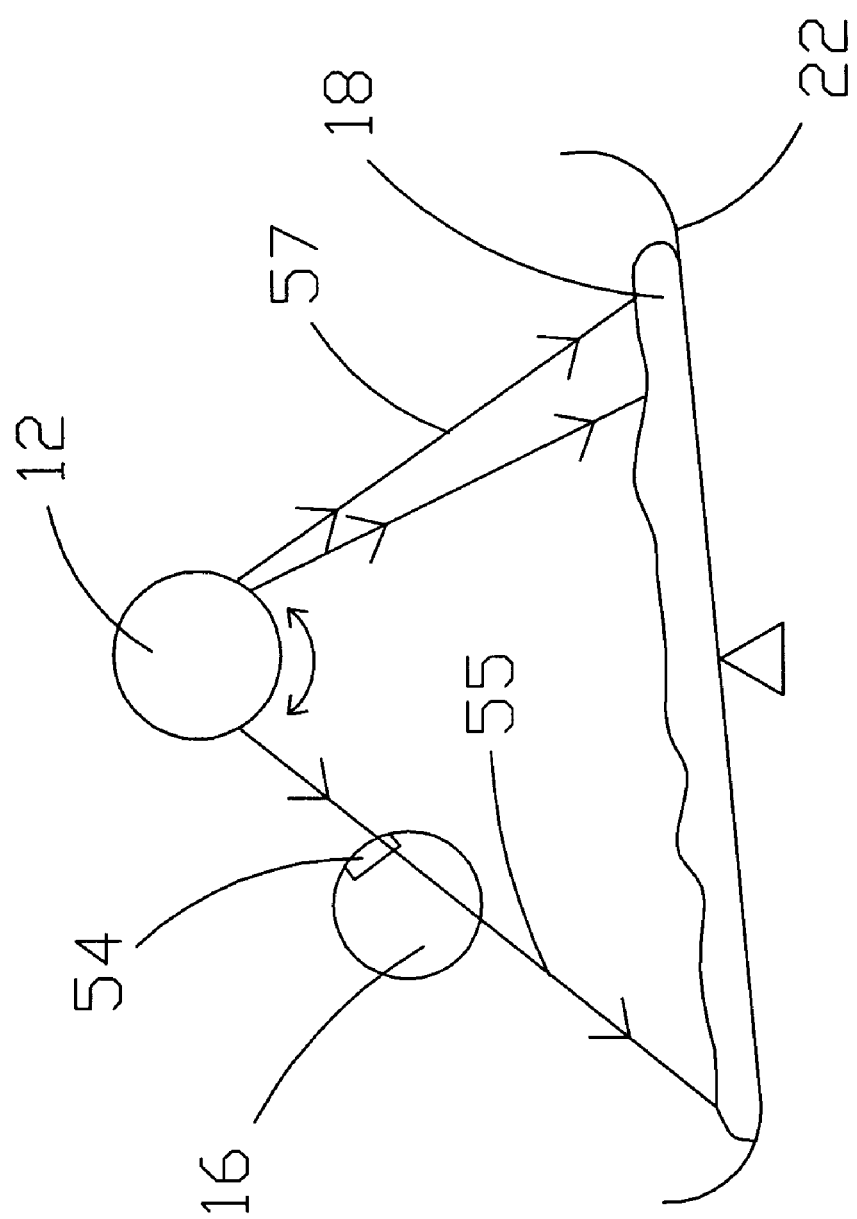

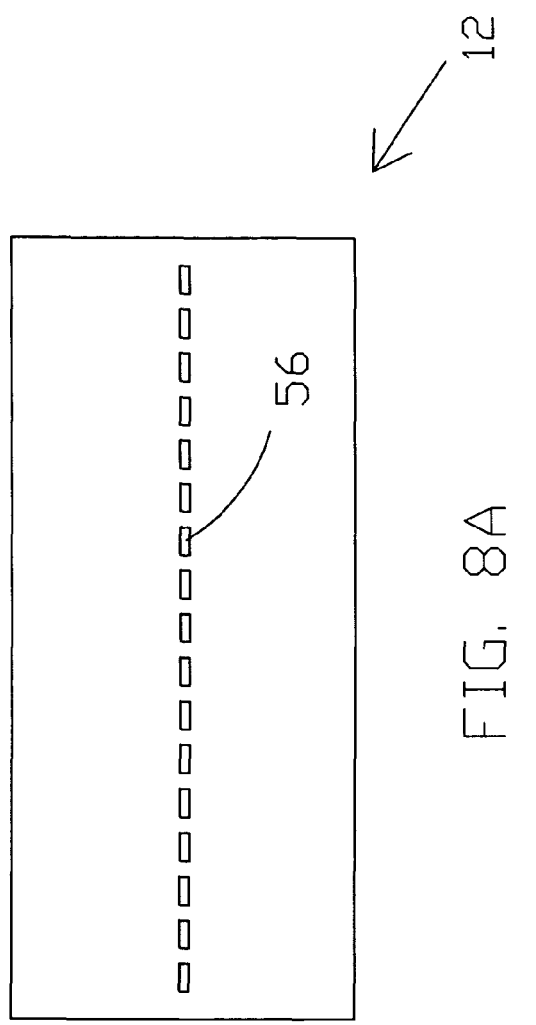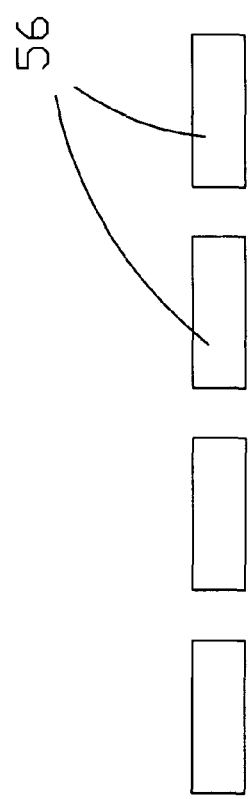
FIG. 8A
FIG. 8B

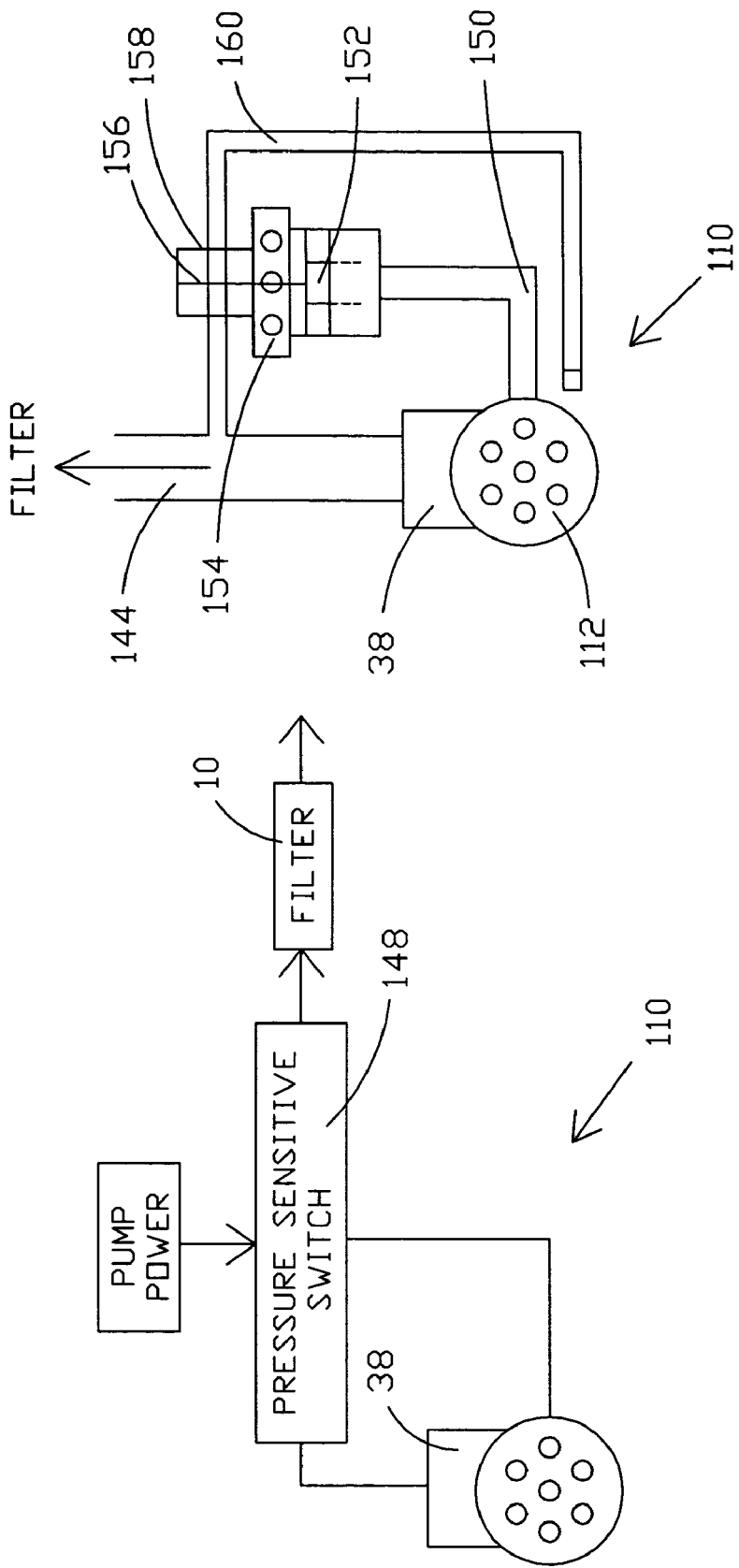

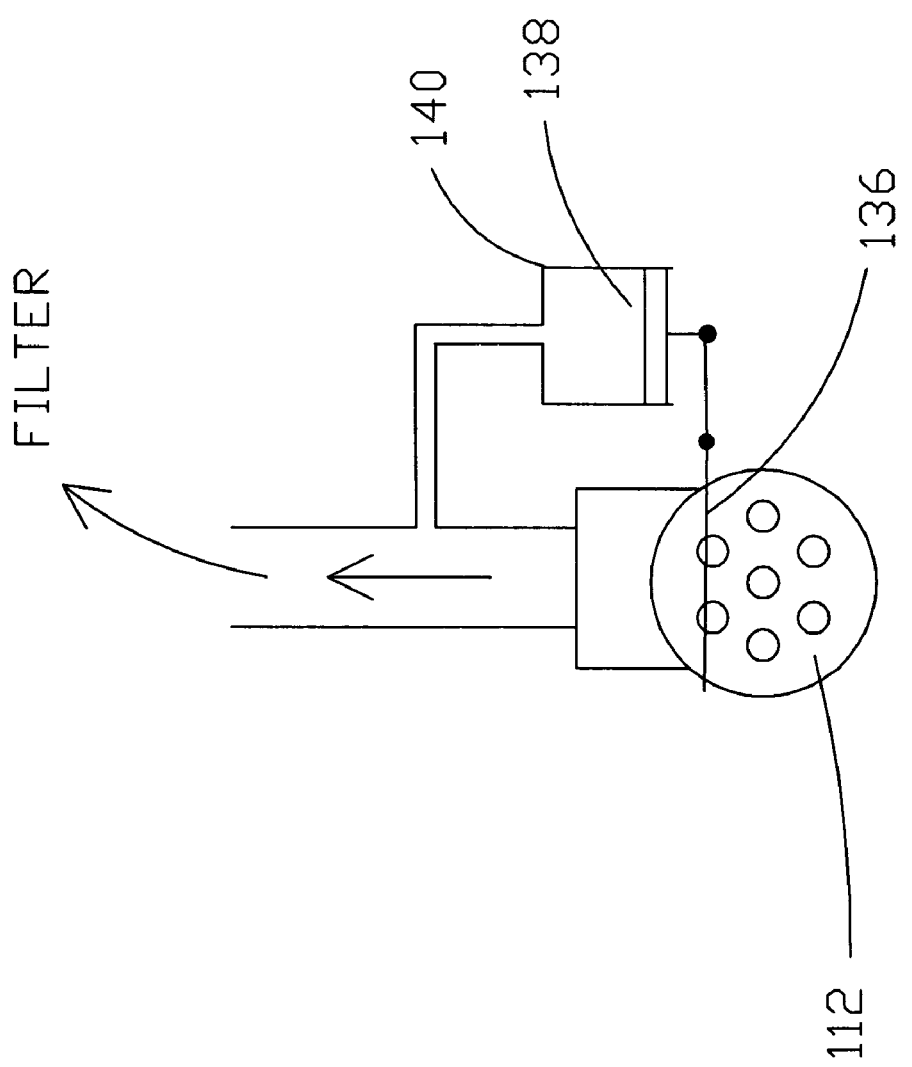

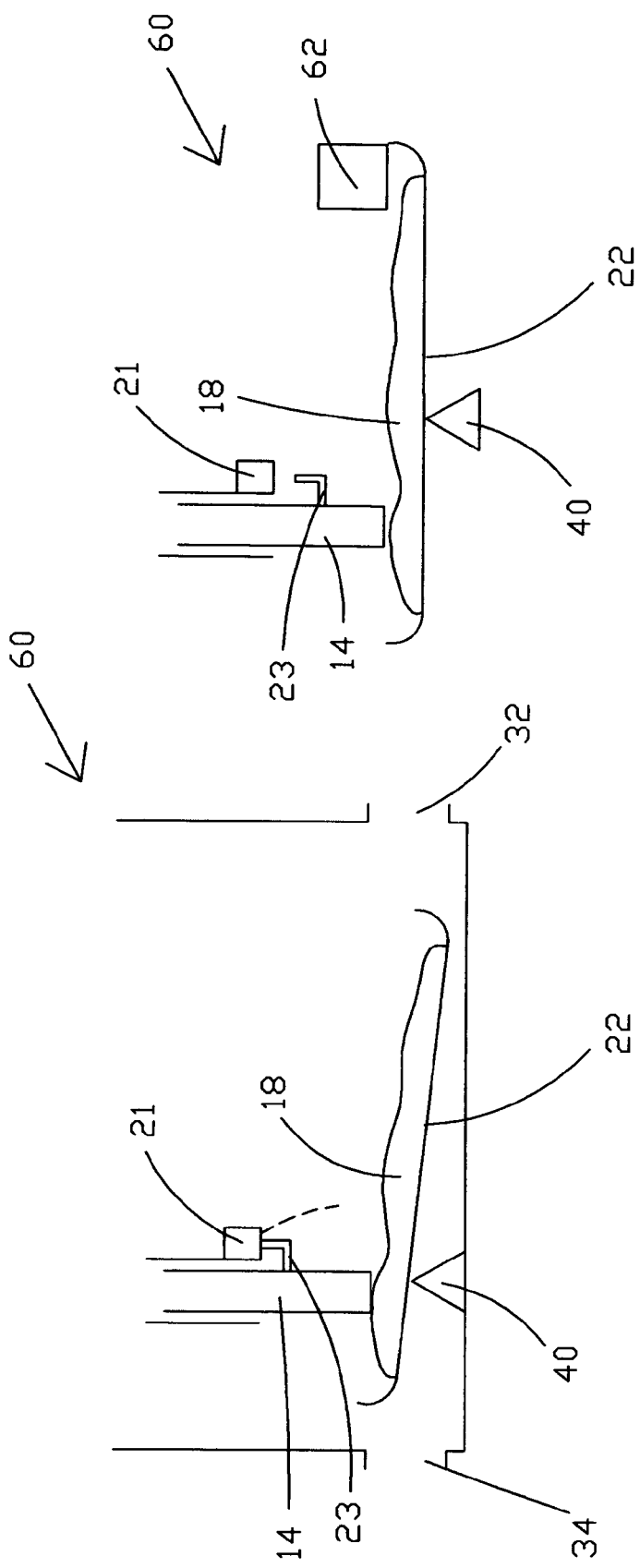

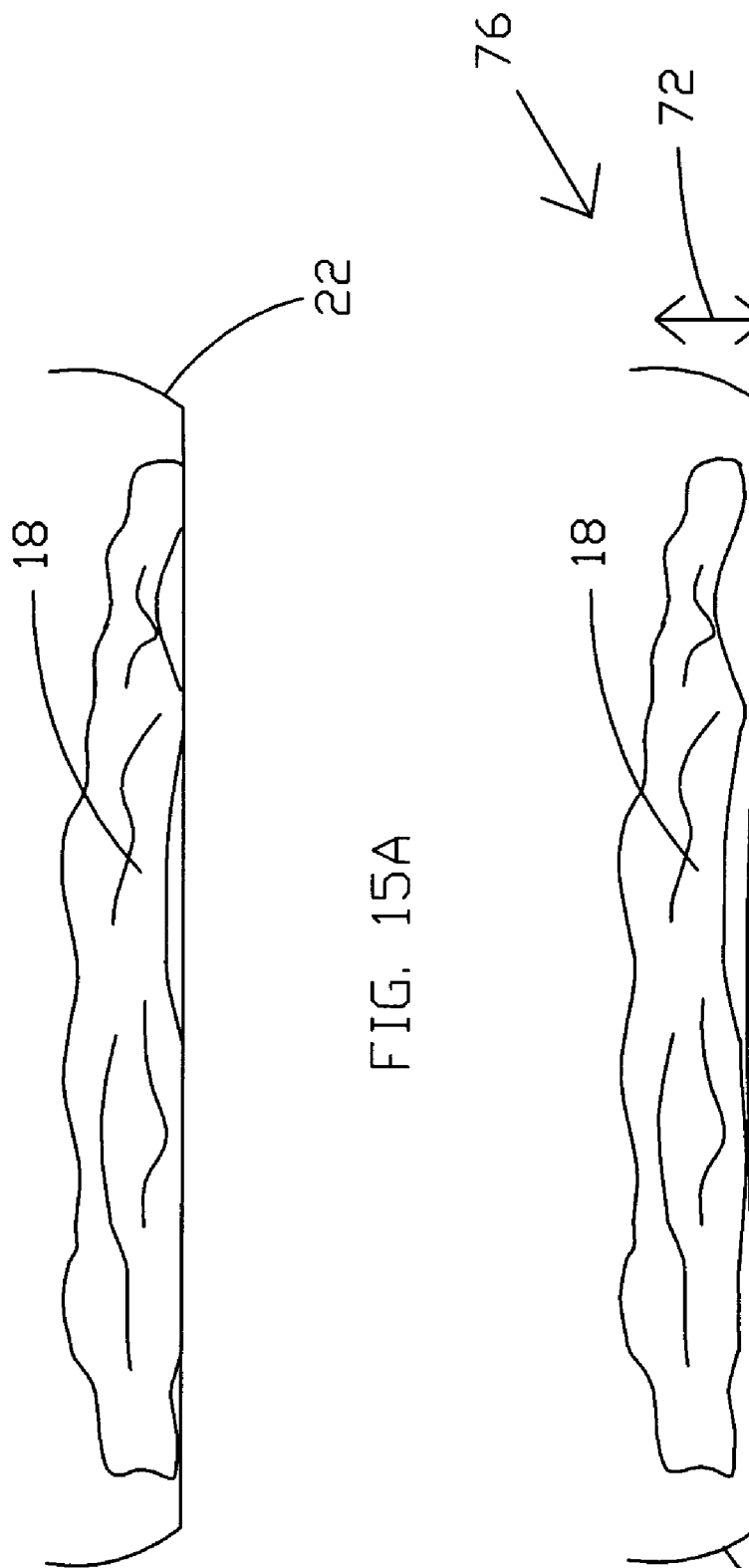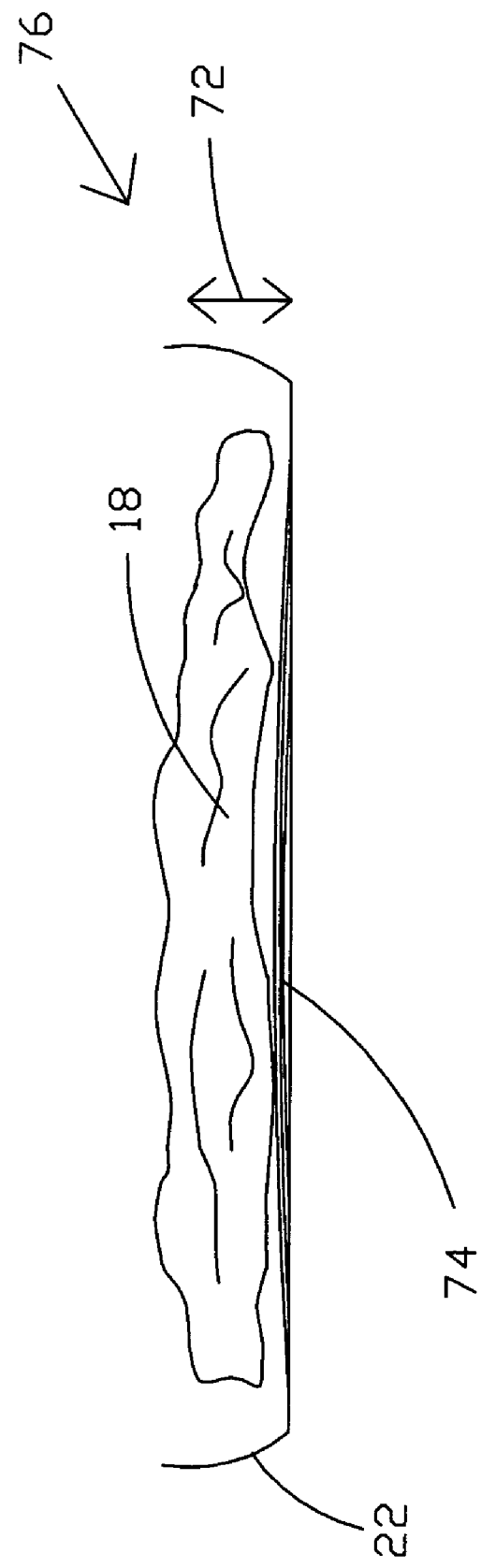
FIG. 15A
FIG. 15B

SELF-CLEANING CIRCULATIN SYSTEM AND METHOD

Benefit is hereby claimed of U.S. Provisional Patent Application No. 60/433,852, filed Dec. 16, 2002, which is hereby incorporated herein by reference.

TECHNICAL FIELD

The present invention relates generally to liquid circulation systems and, more particularly, in a preferred embodiment provides a low or no maintenance water circulation system as may be utilized in ponds, fountains, tanks, and the like.

BACKGROUND ART

Water circulation systems such as pond water circulation systems, fish tanks, waterfalls, and the like, typically utilize a pump and a filter to circulate the water. Most filters on the market today have water being pumped into a canister by an electric pump. The canister has a filtering medium therein. The water circulates through the filtering medium and back to the pond or other water body. To clean the filtering medium, it is necessary to open the canister, reach into an algae-infested medium, which may contain dirt and fish waste, remove the medium and manually clean the medium. The filtering medium must then be returned back to the canister. These chores make for an unpleasant but necessary task. Failure to keep the filter clean eventually causes the circulation system to clog, and/or the fish to die. The filter canister usually includes other components that must be cleaned such as the diffuser which directs the water to be filtered over the filter. However, prior art diffusers often are formed with a plurality of flow holes for performing this function. Over time, algae grows in the flow holes thereby decreasing their diameter until the flow holes eventually plug due to algae growth or debris. These prior art diffusers must be cleaned regularly or the circulation system will fail and the fish will die.

The system typically also includes an electric pump that is typically located within the water and regardless of placement, has an intake for water. The water intake should not become clogged or plugged with leaves, debris, or other matter or the pump can be quickly destroyed. A significant expense related to ponds is the cost of replacement pumps. When the pump quits, the replacement must occur fairly soon to keep the fish alive.

Various attempts have been made in the prior art to solve the above indicated problems and/or related problems. However, the prior art devices and methods have numerous drawbacks. Patents related to such attempts include the following:

U.S. Pat. No. 6,110,389, issued Aug. 29, 2000, to A. Horowitz, discloses a filtration tank for purification of polluted water which includes a chamber. Upper and lower filtration screens are supported within the chamber. Filtration particles are confined between the upper and lower screens. Polluted water enters the chamber through an inlet, passes through the screens and the filtration particles and exits the chamber through a purified water outlet. Periodically, the inlet and outlet are closed and the water in the chamber is drained through a drain outlet. Nozzles spray cleaning fluid over the filter particles and screens to dislodge trapped dirt.

U.S. Pat. No. 5,356,541, issued Oct. 18, 1994, to B. Wickzell, discloses a method and filter arrangement for filtering particle-contaminated liquid which is caused to spill onto the upper side of a filter. Spray pipes, equipped with nozzles, are rotatably mounted beneath the filter, and spray flushing liquid against the underside of the filter. A drainage channel, mounted above the filter surface, catches and directs some of the particle carrying liquid to the outlet. The drainage channel has an extended portion which forms a channel inlet and also functions as a splash guard.

U.S. Pat. No. 2,608,910, issued Sep. 2, 1952, to J. McCrystle, discloses a method for operating a flat screen for screening fibrous materials which consists essentially of the following steps: preparing a suspension of fibers, flowing the suspension over the screen, introducing positive jet streams of water under pressure at an angle less than seventy-five degrees to the plane of the screen onto the input side of the screen, and introducing the streams so that the entire opening areas of the screen are directly, wholly, and simultaneously subjected to the action thereof.

U.S. Pat. No. 4,431,541, issued Feb. 14, 1984, to A. Lee, discloses a circular filter having separated inlet and outlet compartments such that cheese whey or the like is pumped into the vessel, is forced across a filter screen, and the filtered whey is discharged downstream for further processing. This invention incorporates two rotating showers to clean the filter and an outlet valve which recycles filtered whey for additional filtering and cleaning.

U.S. Pat. No. 2,889,048, issued Jun. 2, 1959, to O. L. Nordic, discloses a strainer adapted to collect solid material including a cleaning nozzle, a strainer screen surrounding the nozzle, a rotatable shaft having a portion thereof offset with respect to the shaft, means connecting the offset portion of the shaft to the nozzle, the shaft and the nozzle having a fluid passage therein for conducting fluid through the shaft to the nozzle for discharge from the nozzle at high pressure upon the surface of the screen.

U.S. Pat. No. 5,573,671, issued Nov. 12, 1996, to H. Klein, discloses a biological purification process wherein a secondary treatment of partially cleaned waste water for example, is carried out in a porous bed of loose granules which float in the liquid. The granules are continuously washed to remove coagulated impurities by means of a small quantity thereof being entrained from the top of the bed in a small volume flow of the effluent of the process, mixed with the inflowing impure liquid and then returned to the bottom of the bed. Excess reaction gas may also be delivered to the bed via the inflowing liquid and unreacted gas collected for reuse.

U.S. Pat. No. 6,463,943 B1, issued Oct. 15, 2002, to D. Monroe, discloses a swimming pool filter cleaning device including a cylindrical ring-like housing having an upper end, a lower end, an inner surface and an outer surface defining a central opening. The housing has a hollow interior. The housing is dimensioned for receiving a cylindrical pool filter within the central opening thereof. The housing has a water hose connector extending outwardly from the inner surface thereof. The water hose connector is in communication with the hollow interior. The water hose connector has an open outer end adapted for coupling with a standard water hose. A first set of spray nozzles is disposed within the upper end of the housing in a spaced relationship. The first set of spray nozzles is in communication with the hollow interior of the housing.

U.S. Pat. No. 5,374,360, issued Dec. 20, 1994, to R. J. Weis, discloses a method and apparatus for cleaning a filter apparatus of the type having an atmospherically vented tank, a rotatable filter frame in the tank having filter material thereon providing one or more filter effluent compartments on the filter frame. An influent line supplies liquid containing suspended solids to the tank and a filtered effluent outlet communicates with the filter effluent compartment, and a spray wash device including spray nozzles is operable during a wash cycle to direct high pressure liquid spray at a side of the filter material on the filter frame in a spray zone. An air tight hood is mounted inside the tank and extends above the upper periphery of the filter frame to an open lower end below the spray zone. The hood is vented to atmosphere during a filter time to allow liquid influent in the tank to flow into the hood and immerse the filter frame, and air is supplied to the hood during the wash cycle at a pressure sufficient to pneumatically depress the liquid in the hood to a level below the spray zone.

U.S. Pat. No. 5,945,005, issued Aug. 31, 1999, to Junius et al., discloses a filter system which includes a tank with a conveyer for, preferably continuously, conveying filter media from a filter zone in the tank where the filter media traps predetermined matter, such as particulates, to a quiet zone in the tank where the predetermined matter separates from the filter media and is allowed to accumulate and be withdrawn from the tank. The conveyer preferably includes a screw auger and a duct for containing the screw auger. The filter media is preferably buoyant when the fluid being filtered is water.

U.S. Pat. No. 5,672,281, issued Sep. 30,1997, to Bums et al., discloses an apparatus and method for separating an effluent into a filtered liquid component and a concentrated sludge component. A screen for filtering the effluent is positioned to divide a chamber into two compartments, one for concentrating sludge and one for receiving filtered liquid. The screen is curved in an arc that extends away from the liquid outlet, and a spray arm is mounted for arcuate motion to conform to the curvature of the screen to dispense a fluid against the screen to dislodge attached sludge, to unclog the screen apertures.

U.S. Pat. No. 4,162,219, issued Jul. 24, 1979, to Miropolsky et al., discloses a self-cleaning filter for purifying a liquid from suspended particles which has a housing with pipes for the inlet of the liquid to be purified and for the outlet of the clarified liquid, accommodating at least one filtering partition dividing the internal space of the housing into chambers for the liquid to be purified and for the clarified liquid, and means for flushing this partition with a countercurrent of the clarified liquid. The inlet pipe for the liquid to be purified is arranged on the housing within the chamber for the clarified liquid so that its geometric axis is substantially parallel with the plane of the filtering partition and communicates with another pipe received in the chamber for the clarified liquid so that its geometric axis extends centrally of this chamber, substantially perpendicular to the plane of the filtering partition, the latter having made therein an opening the edges whereof are connected to said another pipe. The disclosed filter is characterized by reliable performance and relatively simple structure.

U.S. Pat. No. 5,268,095, issued Dec. 7, 1993, to Ytzhak Barzuza, discloses a self-cleaning filter including a filter housing having at least a raw-liquid inlet and a clean-liquid outlet, and a filter medium interposed between the raw-liquid inlet and the clean-liquid outlet. At least one nozzle is located in proximity to the filter medium and is connectable to at least two different sources of pressure, one of which is higher than the pressure prevailing in the filter, the other one being lower than the pressure prevailing in the filter. There is also provided an arrangement to produce a relative movement between the filter medium and the at least one nozzle to the effect of having a substantial part of the surface area of the filter medium covered by the nozzle.

The above cited prior art does not provide a suitable means for reliably and automatically removing debris for a pond filter or pump. Consequently, there has been a long felt but unsolved need to provide improved and more reliable apparatus and methods that result in continuous circulation of water with minimal or no maintenance. Those of skill in the art will greatly appreciate the present invention which addresses the above problems and other problems.

SUMMARY OF THE INVENTION

Accordingly, it is an objective of the present invention to provide an improved circulating system and method.

Another objective is to provide a low maintenance circulating system in which one or more components require little or no maintenance.

Another objective of the present invention is to provide an improved water circulation system although elements of the present invention are also suitable for use for circulating/cleaning/pumping other liquids.

These and other objectives, features, and advantages of the present invention will become apparent from the drawings, the descriptions given herein, and the appended claims. However, it will be understood that any listed objective and/or other objectives, features, and advantages of the invention are provided only as an aid in understanding aspects of the invention, and are not intended to limit the invention in any way, and therefore do not form a comprehensive or restrictive list of objectives, and/or features, and/or advantages of the invention.

Accordingly, the present invention may comprise a water circulation system wherein the water requires filtering for cleaning purposes. The water circulation system may comprise components such as, for instance, a pump for circulating the water. The pump may comprise a pump inlet. A pump inlet self-cleaning assembly may be utilized automatically for cleaning the pump inlet. Alternatively or in addition thereto, a self-cleaning filter assembly may be provided.

In one embodiment, the self-cleaning water filter assembly may comprise one or more elements such as, for instance, a housing for mounting a filter therein. The housing may define an unfiltered water inlet for receiving unfiltered water to be filtered. The housing may also define a cleaning water input for receiving pressurized cleaning water. In one preferred embodiment, a reciprocally moving cleaning spray head is mounted above the filter. The moving cleaning head may be operable for spraying the pressurized cleaning water over a top surface of the filter during a filter cleaning cycle which is activated upon the receipt of pressurized cleaning water into the cleaning water input. In a preferred embodiment, a controllable waste outlet is provided which is controllable for opening in response to the filter cleaning cycle and is normally closed except for during the cleaning cycle. A controllable filtered water output may also be provided. The controllable filtered water output is normally open to permit filtered water flow out of the self-cleaning filter assembly. The controllable filtered water output is controllable for closing in response to the cleaning cycle. Many variations of the self cleaning filter are provided some of which do not necessarily comprise all of the above features and/or which may comprise other features.

In one embodiment, a diverter assembly is provided that may be utilized with the self-cleaning water filter system. The diverter assembly is operable for automatically controlling the controllable waste outlet and the controllable filtered water outlet in response to the cleaning cycle. While many embodiments of a diverter assembly are provided, in one embodiment the diverter assembly comprises a pivotally mounted water director, which may or may not also include the filter tray, and/or a water-activated piston. With the water-activated piston, the diverter assembly requires no electrical or pneumatic power and may be operated with a simple water hose for directing pressurized water thereto as is normally locally available.

In another embodiment of the filter assembly, at least one of the controllable waste outlet and the controllable filtered water outlet may comprise a water-activated valve.

A self-cleaning pump for a water circulation system may be utilized which comprises a pump inlet and a pump outlet. In one embodiment, an inlet cleaning fluid line is connected to the pump inlet and a pump inlet cleaning assembly attached to the inlet cleaning fluid line. The pump inlet cleaning assembly may further comprise a nozzle for directing fluid over the pump inlet and/or a piston-cylinder assembly for moving a cleaning blade adjacent the pump inlet for cleaning purposes, and/or a flexible tubing for flapping over the pump inlet as water flows therethrough to provide self-cleaning of the pump inlet.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein:

FIG. 5A is an elevational schematic view of an anti-clog water dispenser for dispensing water onto the filter media having a wide slot therein for water flow in accord with the present invention;

FIG. 5B is an elevational schematic view of fluid flow from the anti-clog water dispenser of FIG. 5A;

FIG. 7 is a diagrammatical elevational view showing a presently preferred range of cleaning spray with respect to the filter and the pond water supply diffuser in accord with one possible embodiment of the invention;

FIG. 8A is an elevational view showing slotted outlets for a preferred sprayer in accord with the present invention;

FIG. 8B is an enlarged diagrammatic view of the slotted outlets shown in FIG. 8A;

FIG. 10E is a schematical view of an automatic low pressure pump cut off switch in the pond water to filter line in accord with the present invention;

FIG. 10F is a schematical view of an automatic relief valve with a separate intake which operates only when the main intake is blocked in accord with the present invention;

FIG. 10G is a schematical view of a buoyant piston wiper assembly which operates whereby the wiper is activated when pump outlet pressure is low;

FIG. 13A is an elevational view showing an offset fulcrum arrangement for closing the cleaning mode diverter piston in accord with one embodiment of the present invention;

FIG. 13B is an elevational view showing weighting means for closing (or assisting closing) the cleaning mode diverter piston in accord with one embodiment of the present invention;

FIG. 15A is an elevational view of a pillow batting filter in accord with one possible embodiment of the present invention;

FIG. 15B is an elevational view of the pillow batting filter or other type of filter being utilized as a bio-filter in accord with the present invention;

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

The present invention provides a novel approach to liquid circulation systems a preferred embodiment of which may be utilized for filtering water for fish ponds, fountains, waterfalls, and the like. The present invention provides a filter that is virtually maintenance free and which may potentially operate for years without any maintenance whatsoever. The present invention provides means for maintaining pump action and other means for maintaining a pond.

Figure 6:
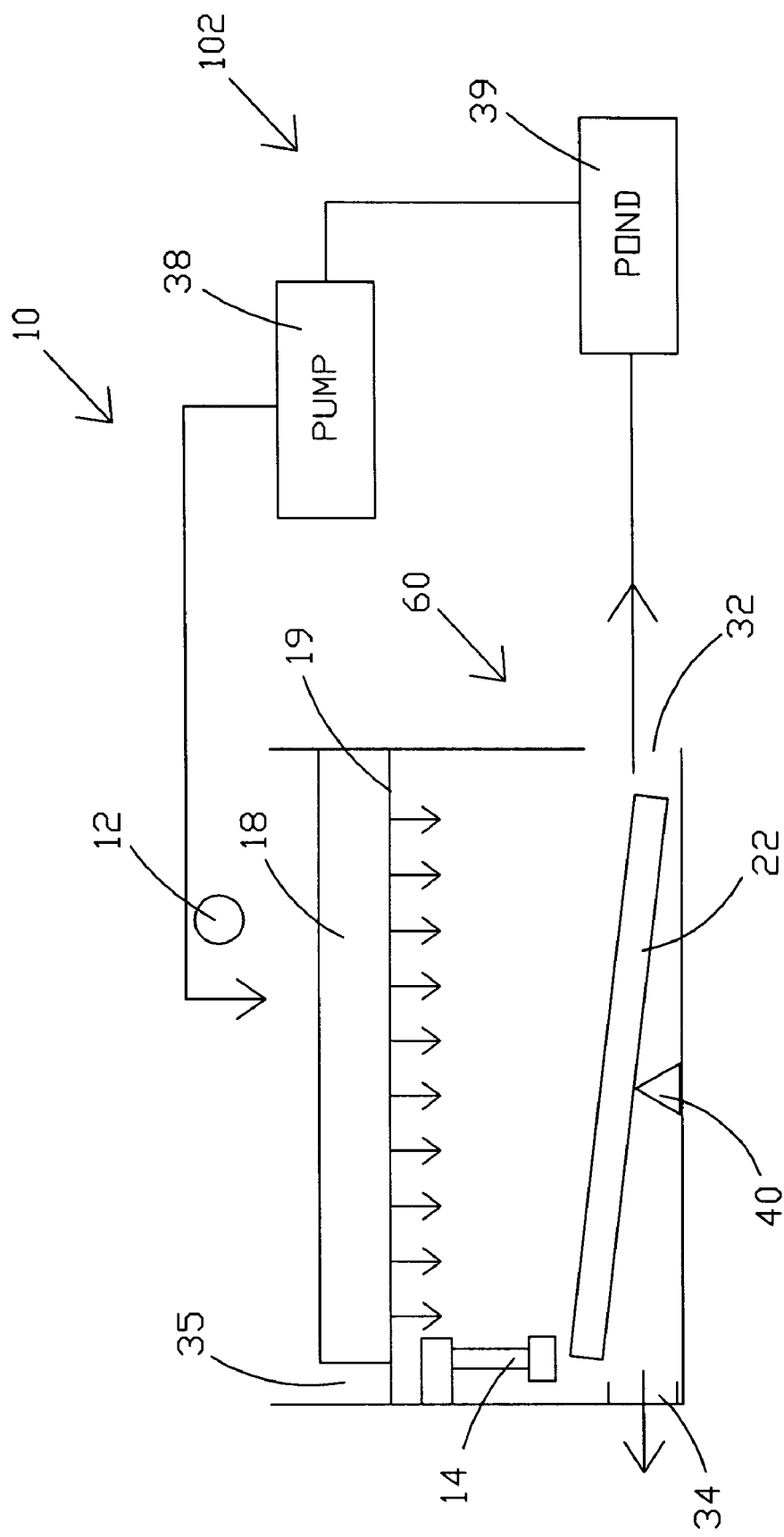
FIG. 6 is an elevational view of another preferred embodiment of the invention wherein the filter media is of drain through construction and the piston for activating the water diverter tray is below the filter media.

Now referring to the drawings, and more particularly to FIG. 1–FIG. 4, FIG. 6, and FIGS. 12A and 12B, there is shown an embodiment of system 10 which is an automatically self-cleaning filter for water circulation systems. An embodiment of system 10 comprises elements such as preferably moveable and/or reciprocating spray head 12, diverter or water piston 14, slotted diffuser 16 for diffusing water from the pond or tank onto filter 18. If desired, then filter 18 may be carried by brace or raised section 20 which has openings therein to permit drainage of water through filter 18 into pivotal water director or water director or tray 22. As shown in FIG. 6, filter 18 may also be carried on fixed filter support 19 mounted above pivotal water director or water director or tray 22. Filter 18 could also be mounted in a separate filter housing spaced apart from housing 54 with the water from filter 18 being directed by conduit to housing 54 whereby pivotal water director member 22 then directs the water to either a waste outlet or back to the pond or tank, as desired.

Figure 2:
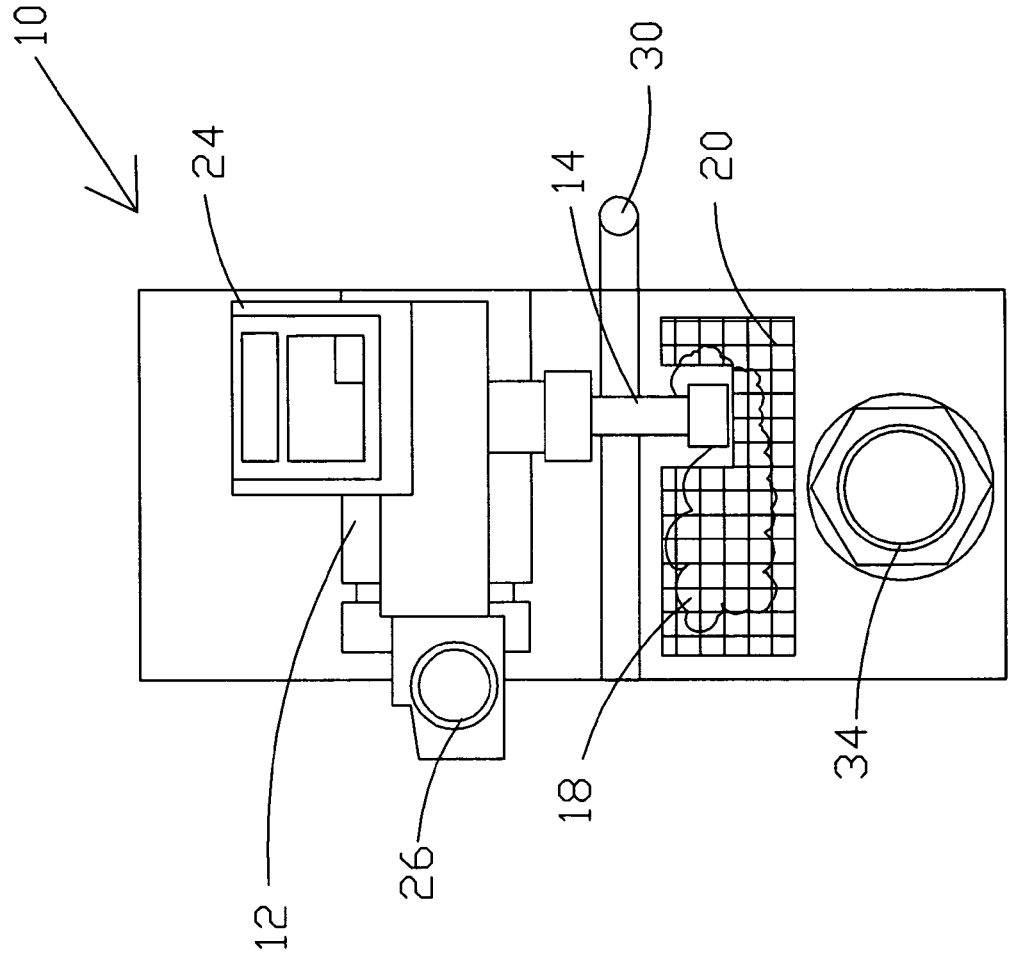
FIG. 2 is a side elevational view with respect to the view of FIG. 1 which also includes a battery or solar operated which may be a commercially available timer for turning a water hose on and off that may be utilized to set automatic self-cleaning times and durations.

Digital water hose controller 24, of a type which can be purchased off-the-shelf, may be utilized to automatically set the timing of filter washing and the duration of the washing as discussed hereinafter. Digital water hose controller 24 has an input 26 and an output with a valve therein for controlling fluid flow therethrough to water hose inlet 28 in accord with timing settings. A manually operated valve may also be utilized whereby the hose is turned on for a few minutes or less for a thorough cleaning of filter media 18 as explained hereinafter. In a preferred embodiment, digital hose controller 24 is mounted near the faucet connection for hose 36, in the preferred embodiment, so that the hose need not have pressure thereon in between cleaning operations. However, digital hose controller 24 could also be mounted on filter system 10 as shown in FIG. 2. In a preferred embodiment, the hose may be attached at hose input 28.

Figure 3:
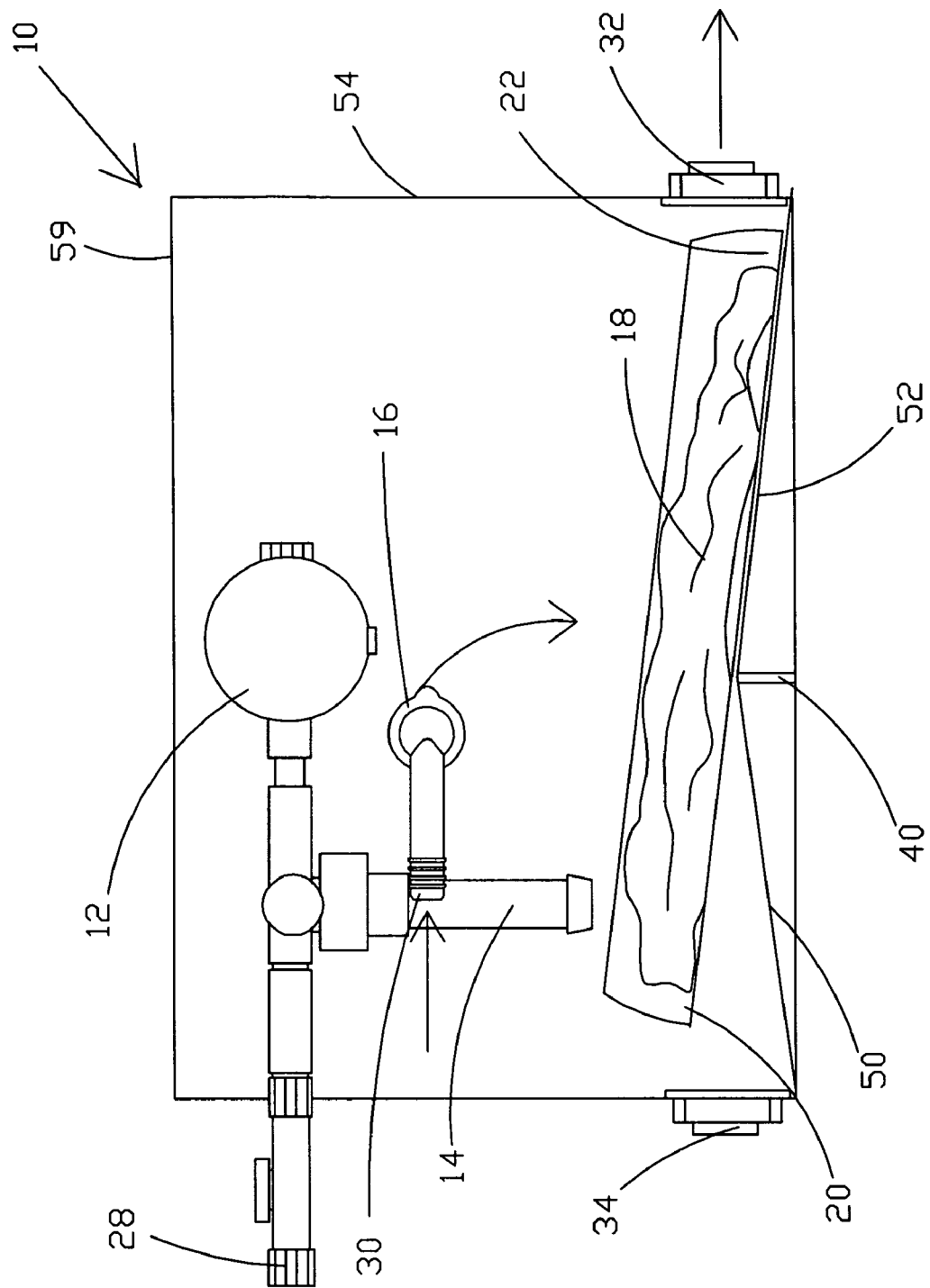
FIG. 3 is a rear elevational view with respect to the view of FIG. 1 of the prototype automatically self-cleaning filter of FIG. 1.

Water from the system pump 38 (see FIG. 12A or 12B) is preferably connected at pump water input 30 (see FIG. 2. and FIG. 3). The connector for pump water input 30 may be a quick release type of connector as shown in FIG. 3, for convenience. Filtered water outlet 32 is utilized to return filtered water to the pond, tank, pool, or other body of water and may include a pipe for this purpose as necessary. Waste water outlet 34 is utilized to drain the cleaning water during the cleaning cycle and may also comprise a hose as desired. Since the water from the cleaned filter for a fish pond comprises excellent fertilizer, the waste water is often drained directed into a garden but could also be directed into the grass or a drain.

Figure 1:
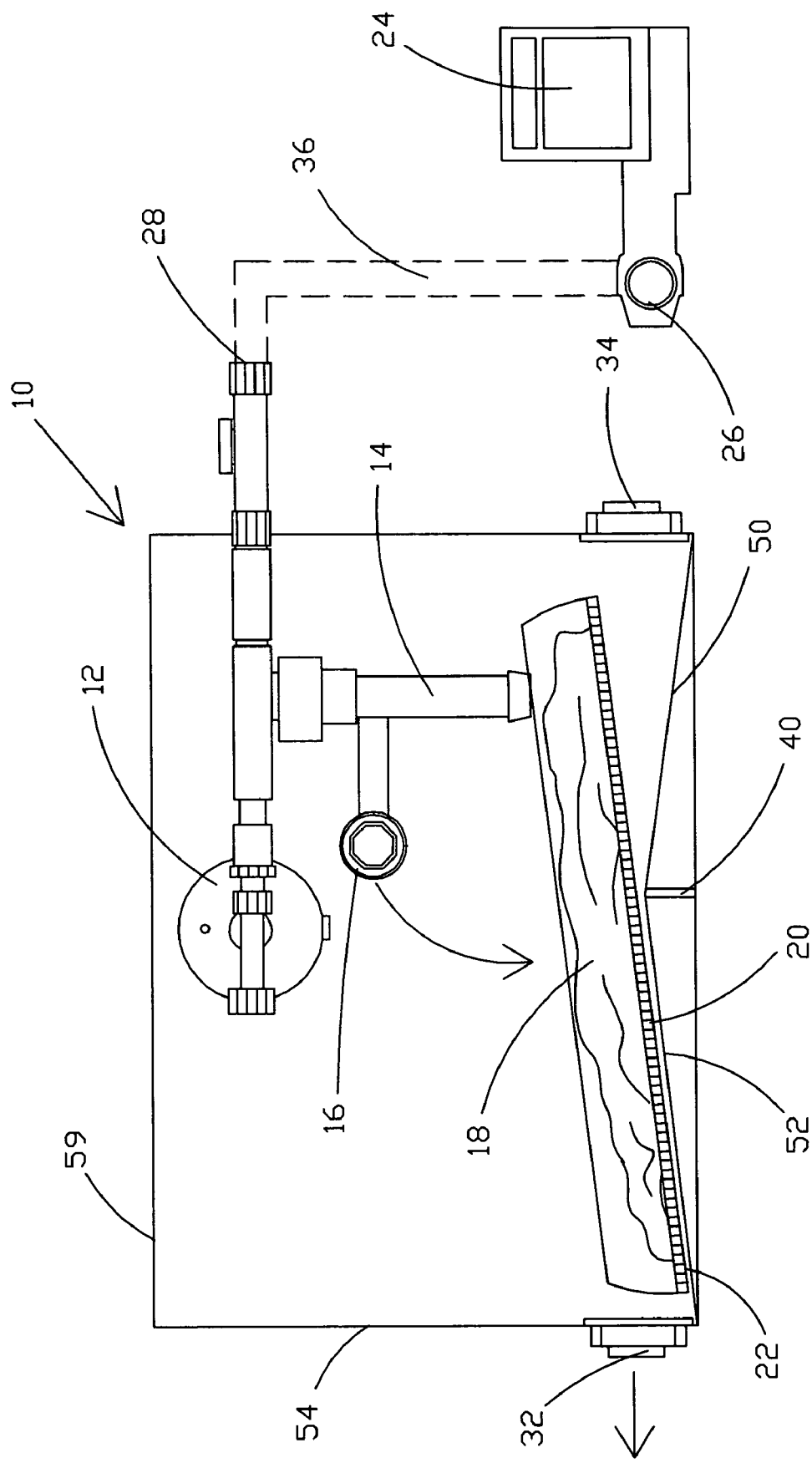
FIG. 1 is a front elevational view of an automatically self-cleaning filter for a circulating system in accord with one possible embodiment of the present invention.
Figure 4:
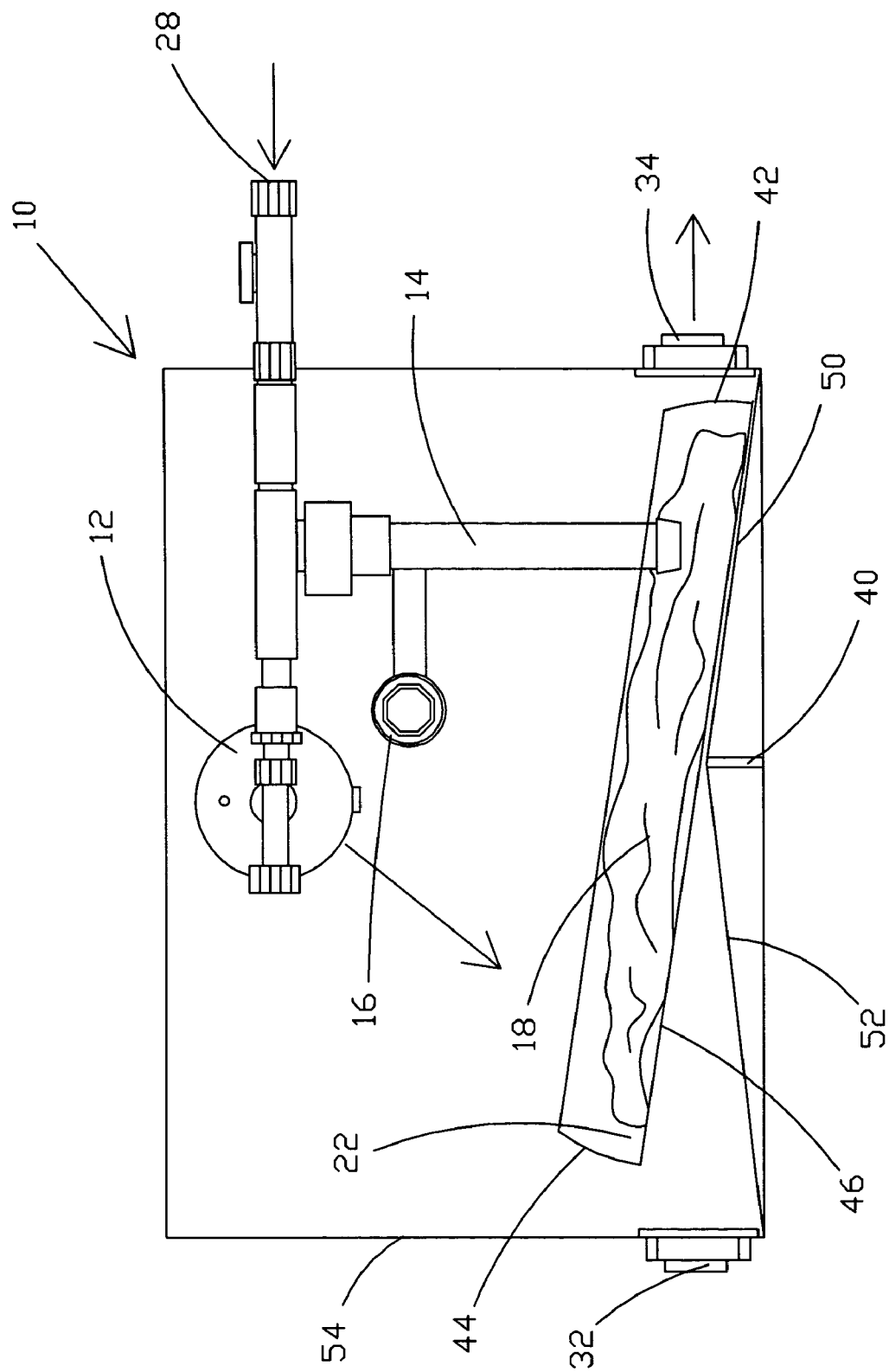
FIG. 4 is a front elevational view of the automatically self-cleaning filter of FIG. 1 wherein a tray for diverting water, which in this embodiment also include the filter media, is tilted in the cleaning position by the activated water piston to divert dirt and debris to the garden or drain.
Figure 12A:
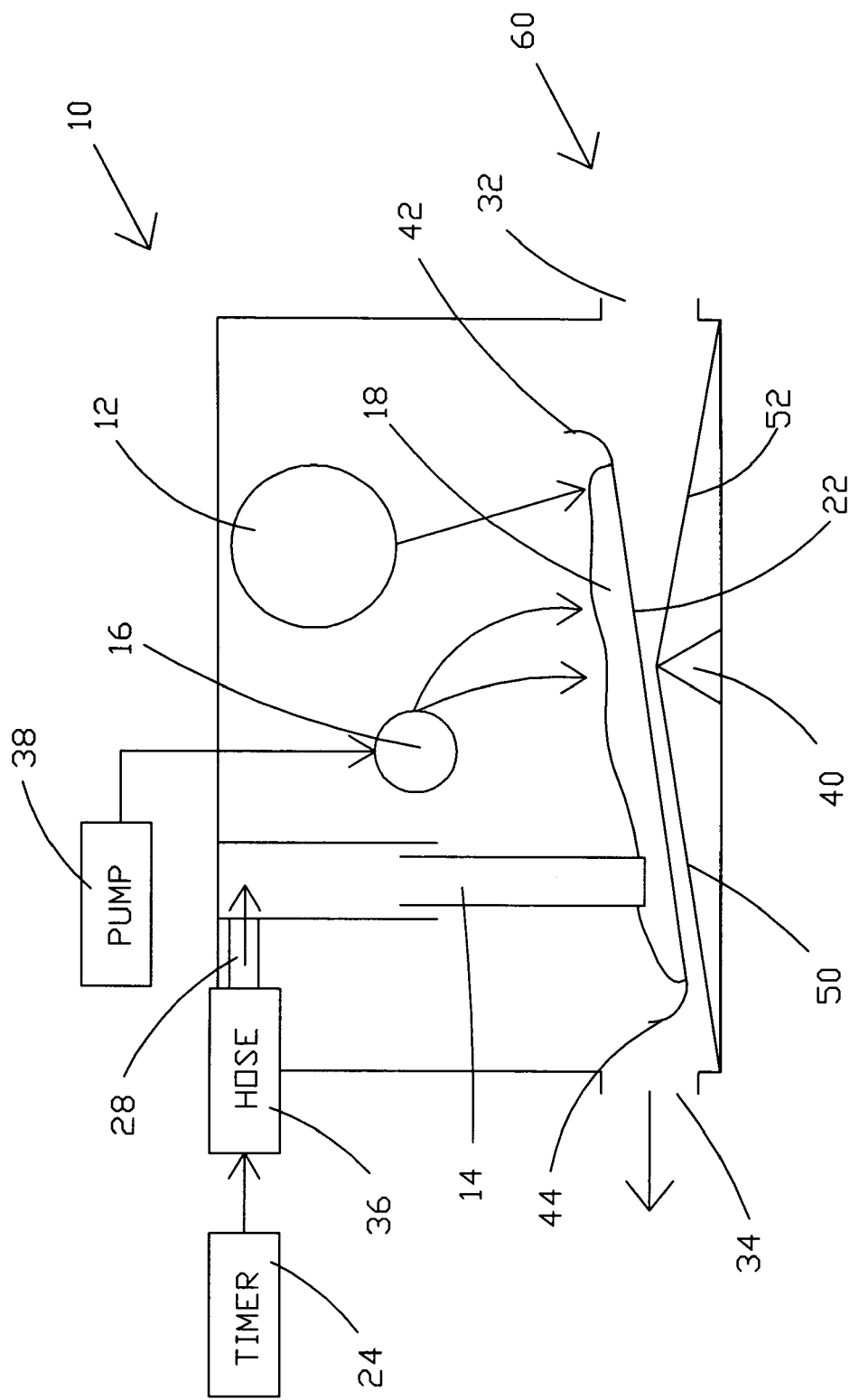
FIG. 12A is an elevational view of one embodiment of the present invention in the automatic filter cleaning mode.
Figure 12B:
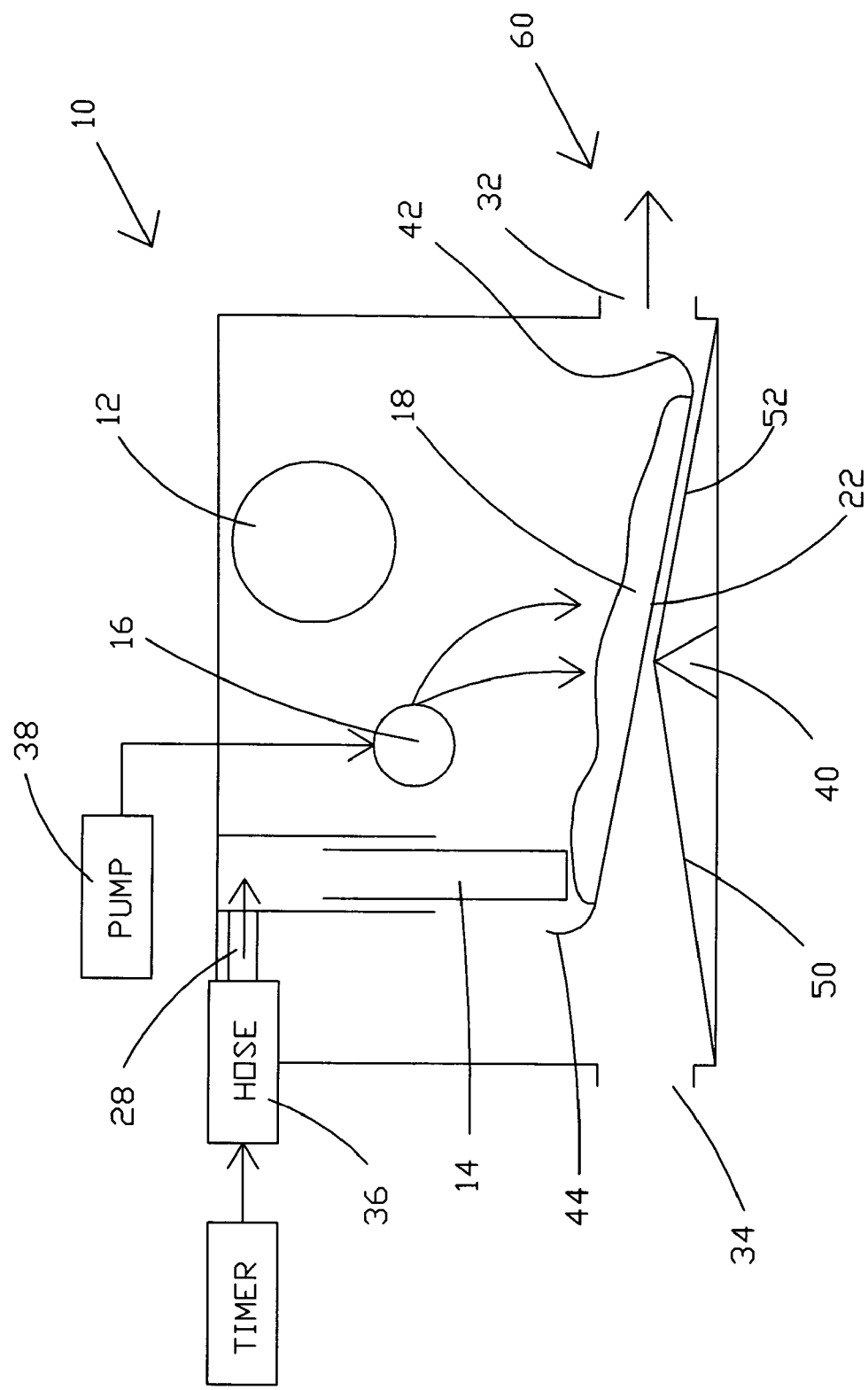
FIG. 12B is an elevational view of the embodiment of FIG. 12A after the automatic filter cleaning mode cycle is completed and operation is now in the filtering mode.

Pivotal water director or tray 22 is pivotally mounted on pivot 40, and may be mounted at an offset from the center to provide a fulcrum action as discussed hereinafter. Pivotal water director or tray 22 preferably has water outlets 42 and 44 on each side thereof but is watertight along bottom 46 thereof. When pivotal water director or tray 22 slants toward clean water or pond outlet 32, as shown in FIG. 1, FIG. 3, or FIG. 12B, then water flows out pond or tank outlet 32 to be returned to the pond or tank due to gravity. Likewise when pivotal water director or tray 22 slants toward waste outlet 34 as shown in FIG. 4 or FIG. 12A, then water drains or flows out of waste outlet 34 due to gravity. Thus, depending on the orientation of pivotal water director or tray 22, the water is diverted to the desired outlet. Slanted drain surface 50 enhances fluid draining toward waste outlet 34 and drain surface 52 directs fluid toward clean water outlet 32 and prevents the fluids from becoming misdirected. Filter housing 54 is utilized to provide a mounting and an enclosure for the components of filter system 10. Filter housing 54 may be completely enclosed as shown in FIG. 3. In a preferred embodiment, top portion 59 of filter housing 54 may be removed so that access is readily available to all components thereof. Filter housing 54 may be opaque to prevent light from entering the filter to enhance algae growth, if desired.

During normal operation, as indicated in FIG. 12B, water is pumped from the pond by pump 38 to diffuser 16 which diffuses water over the surface of filter media 18. While a preferred embodiment of the filter media is discussed hereinafter, the filter media may comprise a sponge, gravel, fibers, bio balls, or virtually any other suitable filter media. Filtered water drains through filter media 18 and flows out of tray outlets 42 on the side of pivotal water director or tray 22 toward clean water or pond outlet 32. Over time, fish debris, dirt, algae, and the like are trapped on filter media 18. Self-cleaning may be automatically activated by a timer such as timer 24, by the sprinkler system, or by simply turning on the hose.

When water under pressure (which pressure may range over a wide range for use by city systems, well water systems, and the like) is applied to inlet 28, then water piston 14 is activated thereby tilting or pivoting water director or tray 22 toward waste water outlet 34 as shown in FIG. 4 or FIG. 12A thereby causing water to flow into the grass, drain, garden, or the like. Water piston and spray head 12 are fluidly connected together so the same water pressure also causes spray head 12 to rotate left and right with high water pressures, cleaning the algae, fish debris, and dirt off of filter media 18. In one embodiment, a range of spray from spray head 12 is shown in FIG. 7 where washing occurs over most of filter media 18 and also cleans out diffuser 16 slotted opening, as discussed hereinafter. Cleaning will normally be accomplished in about two minutes.

Once the water pressure connected to inlet 28 is removed or bled off, such as by timer 24 turning off or manually turning the water off, then the weight of filter media 18 in offset mounted pivotal water director or tray 22, causes pivotal water director or tray 22 to pivot and easily forces piston 14 to close. Pivotal water director or tray 22 pivots or rotates about pivot 40 until the tray again slopes toward clean water outlet or pond outlet 32 as shown in FIG. 12B.

Automatic timer 24 may be set for a specified number of minutes or a specific day, depending on the size of the pond. The device could also be connected to a sprinkler system and then runs during the same time the sprinkler is set for.

FIG. 13A and FIG. 13B show further details of the operations of the above described diverter 60 which diverts water to either waste outlet 34 or clean water outlet 32. The offset of pivot 40 and the weight of filter media 18 may be utilized to provide a significant force to close piston 14 and direct fluid to clean water outlet 32. In one preferred embodiment of filter media 18, the media is fairly thick and relatively heavy so that a significant force is produced to close piston 14. However, if desired, such as with a very thin or light filter, or if the filter media is mounted above tray 22 as shown in FIG. 6, then weight 62 may be added to pivotal water director or tray 22 as indicated on the end adjacent clean water outlet 32 an example of which is shown in FIG. 13B. In one embodiment, weight 62 may simply be a cup that fills with water during the wash cycle due to water being sprayed therein from spray head 12. In another embodiment, a bismuth weight may be utilized. Bismuth is a preferred weighting material instead of lead or other metals because bismuth is not harmful to the environment, and does not rust to harm pond water. Thus, the upward force required to close piston 14 for operation of diverter 60 can be produced in a variety of ways in accord with the present invention.

In one embodiment, a dispenser such as dispenser 21 shown in FIG. 13A may be utilized for dispensing chemicals onto filter 18. Chemicals may include water clarifier, and the like. In operation rod 23 on piston 14, or any suitable mechanical linkage, may impact an elastic bulb, injector, or the like on dispenser 21 to thereby inject the chemicals, preferably only a few drops, onto filter 18. Various types of dispensers are available which release a selected amount of fluid as a result of impact, such as with a poppet valve and/or rubber injector bulb, or the like. Thus, each time the wash cycle ends, and piston 14 retracts, then the chemicals are automatically dispensed onto filter 18 as arm 23 encounters an injection element on dispenser 21. Attentively, dispenser 21 may be on a timer, or connected to the pressurized cleaning fluid, or the like, and mechanically arranged so as to provide an injection of chemicals at a desired time interval. In yet another embodiment, dispenser 21 may be arranged to operate by dispensing chemicals during the cleaning cycle rather than after the cleaning cycle. Thus, the present invention provides an automatic chemical dispenser 21 within the filter housing and/or within a diverter housing and/or withing a housing with both the filter and diverter.

Figure 14:
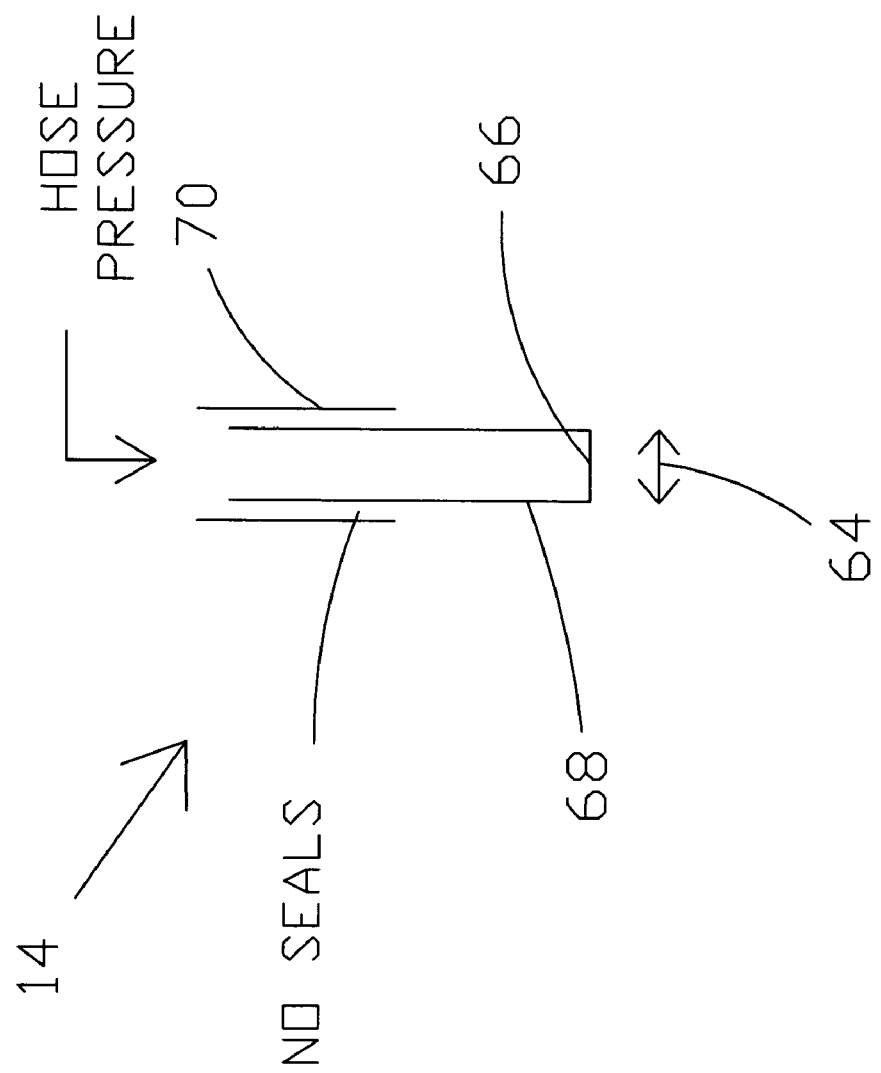
FIG. 14 is an elevational view of a diverter piston in accord with the present invention.

FIG. 14 provides details regarding water activated piston 14. Piston 14 has a diameter 64 selected so that sufficient force is produced to overcome the weight or upward force of pivotal water director or tray 22 which biases piston 14 to the closed or retracted position as discussed above. Diameter 64 is selected so that the force produced is adequate over a wide range of water pressures as may be utilized in city water systems, well water systems, and so forth. Water piston 14 thus preferably has a closed end 66 on piston 68. Piston 68 is telescopingly interconnected with cylinder 70. In a preferred embodiment, there is no seal between piston 68 and cylinder 70 other than the fit there between. Due to the water flow from the hose, the pressure and force produced by water piston 14 is maintained during the washing cycle in spite of leakage that may occur between piston 68 and cylinder 70. Thus, seals are not at all necessary for operation of water piston 14. Moreover, the absence of seals avoids the problem of seal deterioration which often occurs with pond water related items. As the seals deteriorate, it is highly likely that the piston 68 and cylinder 70 would eventually become stuck. Avoiding seals prevents this possibility and results in a long lifetime of trouble-free operation of water piston 14. Moreover, the absence of seals also is a safety feature because high pressures can always bleed off through the space between piston 68 and cylinder 70. In accord with a preferred embodiment of the invention, piston 40 and diverter 60 avoids any use of springs which normally comprise metal. In a preferred embodiment, gravity biasing means is preferably utilized rather than springs. Metal and rust are harmful to the pool environment and cause fish to die. Moreover, rusting springs will eventually fail thereby reducing the reliability of the system. Therefore, it is desirable to provide a metal-free diverter system in accord with the present invention. In one embodiment of the invention, a pop-up water sprinkler head may be utilized as a low cost and readily available piston assembly. While the preferred embodiment utilizes water piston 14 to operate pivotal water direct 22, water piston could operate any type of means for diverting fluid, e.g., valves, plates, rods, and the like. FIG. 18B shows as example of use of water piston 14 as a normally closed valve with gravity biasing.

While piston 68 and cylinder 70 are shown mounted vertically, these elements could also be mounted horizontally and may be attached to an arm or in any other mechanical linkage for operated pivotally mounted water director member 22. It should also be noted that while pivotally mounted water director is shown as an open top element, member 22 could also comprise a closed top, or be tubular, or be y-shaped, or the like, depending on the application, whereby pivotal movement may be utilized for directing water towards the desired outlet.

FIG. 15A and FIG. 15B disclose preferred embodiments for filter medium 18 in accord with the present invention. However, it will be understood that the invention is certainly not limited to the preferred filter medium 18 and that virtually any type of filter medium may be utilized in accord with the present invention. No attempt is made here to list all the different types of filter materials that have been utilized in the prior art and which would also be effective for use with the present invention. However, most filters are quite expensive and require replacement after use. In a preferred embodiment filter, the present invention utilizes pillow batting, which is extremely inexpensive and which can be cleaned for very long lasting use. Pillow batting bulky material is made from strips/pieces of fabric or other fibers, and is used for padding and stuffing such as in pillows. This material may also be called batt. It may be made from poly fibers such as polyester, cotton or the like, and is utilized for making pillows. It is in pieces, which are not bound together, and is placed loosely in position but may be held in tray 22 by clamps, if desired. In this embodiment, growth of the algae and/or bacteria actually bind the loose pieces of filter medium such that filter 18 then become a one piece item. This material is extremely inexpensive and also extremely long-lasting. Essentially, the filter will probably rarely or perhaps never need replacing if made of this material and washed as taught herein. The filter material is typically a few inches thick but could be thicker or thinner depending on the application and size of the filter.

FIG. 15B discloses bio-filter 76 in accord with the present invention. Generally, algae/bacteria will grow in filter medium 18. During the wash cycle the algae/bacteria/debris/waste will be washed out and depth 72 of the washing will depend on the time or duration of the washing. In one preferred embodiment, the washing cycle stops before washing out bottom layer 74 wherein algae/bacteria still resides remains on the bottom side of filter medium 18. In other words, the wash cycle preferably terminates before bottom layer 74 is washed out. An appropriate washing cycle time may be selected depending on the size of filter medium 18, water pressure, and so forth, which results in leaving bottom layer 74 in place. This layer of algae/bacteria is quite useful for trapping very small particles, such as microscopic algae, in filter medium 18 which otherwise would pass back into the pond. The use of bio-filter 76 filters algae in the pond water to thereby limit algae growth.

FIG. 5A and FIG. 5B discloses preferred diffuser 16 for the present invention which is utilized to spread the water to be filtered over the surface area of the filter for the most efficient filtering. As discussed herein, prior art diffusers frequently have holes therein for this purpose. However, such holes through which the pond water flows continually are subject to algae growth that constricts the hole size until the holes become plugged either by algae or by dirt and debris. Applicant's design utilizes instead a wide slot 54 wherein algae is much less likely to form. Slot 54 is much larger than the diameter of a plurality of holes and therefore cannot be plugged. Moreover, because of the ongoing turbulence within tubular diffuser 16 due to the pumping action of pump 38, water does not necessarily continually flow through any portion of slot 54. Slot 54 may typically have a width in the range of a quarter inch to one-half inch or more, depending on flow rates, size of the filter, and so forth. Moreover, although algae is highly unlikely to form in slot 54, nonetheless in another embodiment of the invention, during the cleaning discussed hereinbefore, slot 54 is cleaned with jets of water from spray head 12.

As indicated in FIG. 7 spray head 12 sweeps back and forth during the cleaning operation with a sheet of spray that traverses or spans from sweep spray 55 to sweep spray 57. Spray head 12 is a rotating spray head which rotates or reciprocates in back and forth motion with an internal water motor as is well known and for which many varieties may be found for watering lawns and the like. As shown in FIG. 7, slot 54 is preferably positioned so as to be in line or within the extent of rotational sweep of spray head 12 so as to be cleaned by pressurized water whenever filter 18 is cleaned. Thus, to the extent any debris or the like becomes trapped in diffuser 16, it is automatically washed away during the self cleaning cycle.

FIG. 8A and FIG. 8B disclose features of a presently preferred embodiment of sprayer head 12 in accord with the present invention. Various types of moveable spray heads could be utilized to sweep over the surface of filter media 18 including rotating, oscillating, and so forth. However, in a preferred embodiment the spray issues from slots 56 rather than holes as may be provided in typical spray heads. The use of holes directs a plurality of streams in a straight line to the filter media. Each of these streams hit the filter media at one point and the streams do not as effectively clean the portion of the media between the streams. On the other hand, slotted holes, which may typically be substantially rectangular or, at a minimum, having different dimensions such as different vertical and horizontal dimensions, produce a plurality of streams that spread out and preferably actually overlap each other. Therefore, the entire media is uniformly cleaned in accord with the present invention. It will be noted that during operation of spray head 12, it has been found desirable to utilize a water restriction to limit the amount of water flowing therethrough if necessary to prevent excessive water within housing 54.

While a preferred embodiment of the invention utilizes pressurized water from a municipal water supply or from a well, the pump could also be the source for pressurized cleaning fluid. However, due to the particles in the water from the pond, slots 56 should be larger to prevent clogging. For instance, when a pump output may be directed through a smaller outlet to provide less water at higher pressure for this purpose.

Due to the wide differences in water pressures from one city or municipality to another, and for use with well water systems, a water pressure adjuster may be utilized with the present invention to regulate the pressure of the pressurized water utilized as cleaning fluid.

Filtering system 10 may be implemented in many different forms. As discussed hereinbefore, FIG. 6 discloses an embodiment where diverter 60 including piston 14 is mounted below fixed position filter medium 18. This embodiment may be of benefit especially where filtering media is larger and not so easily carried by water director or tray 22. However, this embodiment could be utilized for any size filter, if desired. Operation of diverter 60 and the washing system with spray head 12 is essentially the same as described hereinbefore. If desired, gap 35 may be provided for washing waste from the surface of filter 18 into waste outlet 34 during the cleaning cycle. If desired, filter 18 could also be sloping one way or the other, such as towards waste outlet 34 to enhance washing. In this case water circulation flows as indicated by the arrows from pump 38 into filter media 18 therethrough to water director or tray 22 and out filtered water outlet 32 to pond 39. When pressurized water from a hose is applied to spray head 12, then water piston 14 tilts water director or tray 22 so that water then flows out waste outlet 34. As discussed hereinbefore, a weight may be provided on water director or tray 22 to tilt the tray towards filtered water outlet 32 after the pressurized water source is turned off and to thereby move water piston 14 back into its closed position at the same time. It will be appreciated that because filter 18 is positioned away from water director member 22 as shown in FIG. 6, that filter 18 could also even be positioned in another housing above or offset from a diverter at some distance, if desired.

In another embodiment, filter 18 could, for instance be positioned in a sealed housing mounted under the water. The pump would then pump water through the filter and water director or tray 22 would normally direct the water back to the pond. However, when spray head 12, which might be mounted above or below filter 18 in this case and may be entirely under the water, the cleaning fluid would wash filter 18 and then be directed to a waste outlet utilizing water director member 22. Water piston 14 may be utilized to provide valving, diverter action, and the like to direct cleaning fluid and waste to a desired location during washing and then back into the pond after the cleaning cycle is over for normal filtering.

Figure 16:
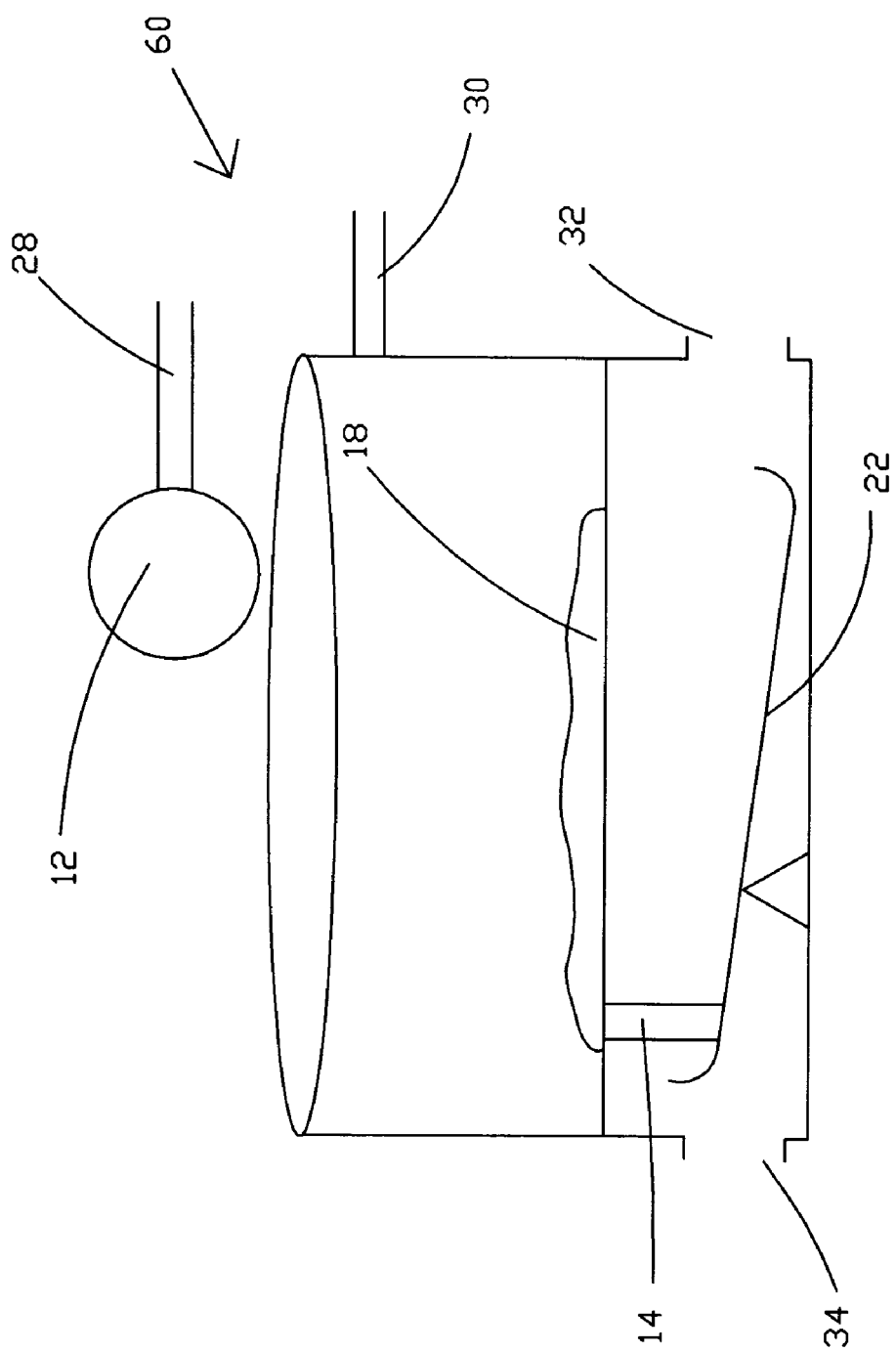
FIG. 16 is a perspective view of another possible embodiment of the present invention built into a cylindrical filter tank construction.

In another embodiment, FIG. 16 shows a cylindrical arrangement with diverter 60 positioned below filter medium 18 which may comprise various types of round filter mediums as desired. In this system, filter medium 18 again may be fixably mounted above water director or tray 22. Spray head 12 is mounted above filter medium 18. During filtering water flows into inlet 30, through filter medium 18, and out filtered water outlet 32 to the pond. When piston 14 and spray head 12 are activated, then tray 22 directs waste water to waste water outlet 34.

Figure 18A:
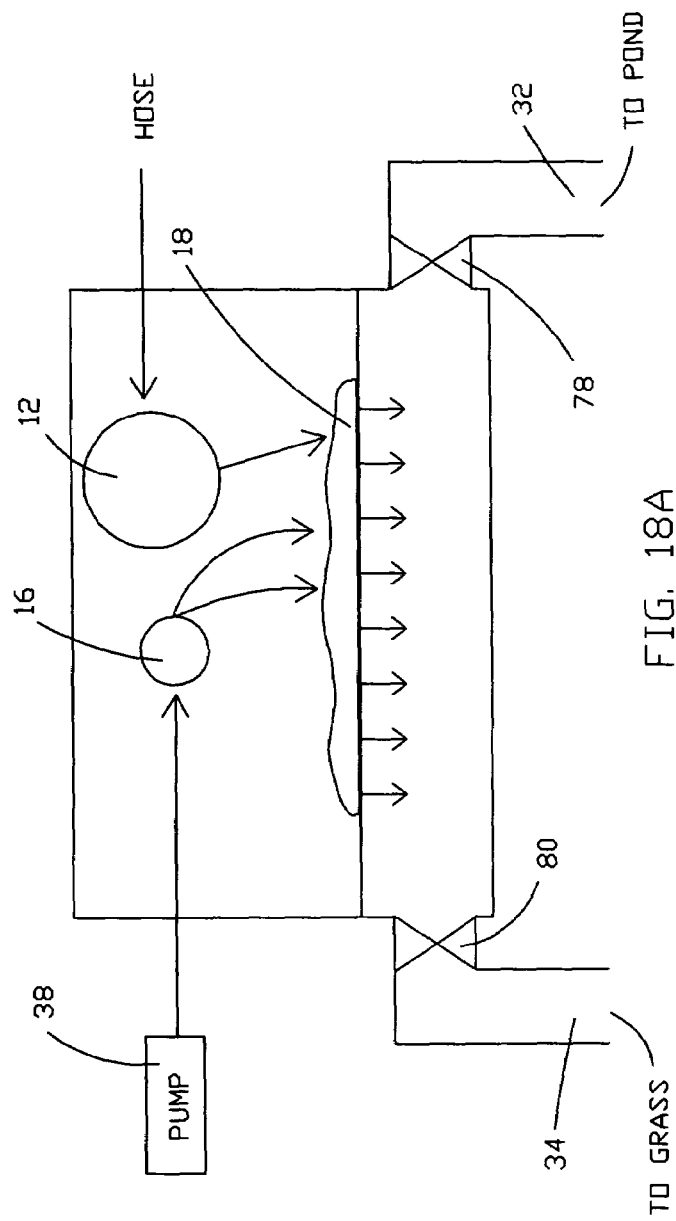
FIG. 18A is an elevational schematical view of an embodiment of the invention utilizing valves instead of a diverter.
Figure 18B:
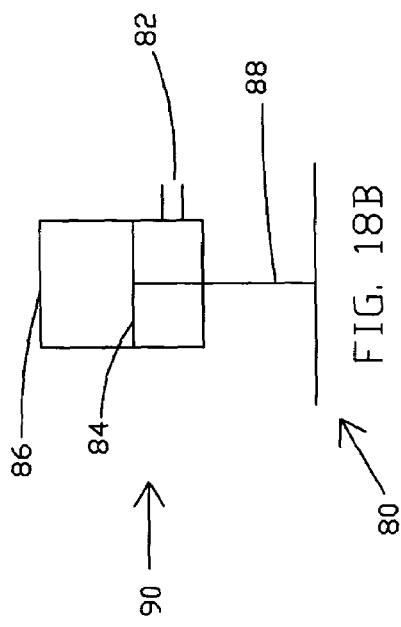
FIG. 18B is an elevational schematical view of an embodiment of the invention utilizing water activated valves for use in the embodiment of FIG. 18A.

In FIG. 18A, diverter 60 is replaced by valves 78 and 80 which are preferably automatic valves, and may be water activated valves. Washing head 12 is still utilized for cleaning filter medium 18 from the top-down as described hereinbefore. If desired, gap 35 (see FIG. 6) may again by utilized for washing waste to outlet 34 from the surface of filter medium 18. While this embodiment is within the spirit of the invention, it is nonetheless not the preferred embodiment due to the higher cost of valves 78 and 80 and, if desired, the requirement for power means to operate the valves. Thus, it may be necessary to run electrical wires and provide electrical controllers for the valves. In another embodiment, the valves may be controlled by water pressure. Alternatively, waste outlet 34 could be moved upwardly and positioned to the side of filter 18 or slightly above filter 18 whereby waste water would be directed therein during the washing cycle due to excess water flow produced by spray head 12 (and assuming there is no gap 35). In this embodiment valve 80 and valve 78 may be removed or valve 80 alone may be used.

For example, FIG. 18B discloses a normally closed, i.e, a valve biased to closed position, water activated gate valve 90 whereby when water pressure from the hose is attached to inlet 82, piston 84 is pressed upward toward vent hole 86 and thereby opens gate 88 to permit waste to be discharged therethrough. When the water pressure is cut off, then the weight of gate 88, and piston 84 then closes gate 88. A normally open, i.e., valve biased to the open position, water activated valve 78 may be implemented in a similar manner by reversing the orientation of water activated gate valve 90 whereby the weight of gate 88 and piston 84 holds the valve open until water pressure is applied on the opposite side of piston 84 (such as at inlet 86) whereupon gate 88 moves upwardly to close the valve during the washing operation. Otherwise, the weight of gate 88 keeps the valve open during normal filtering operation.

Figure 20:
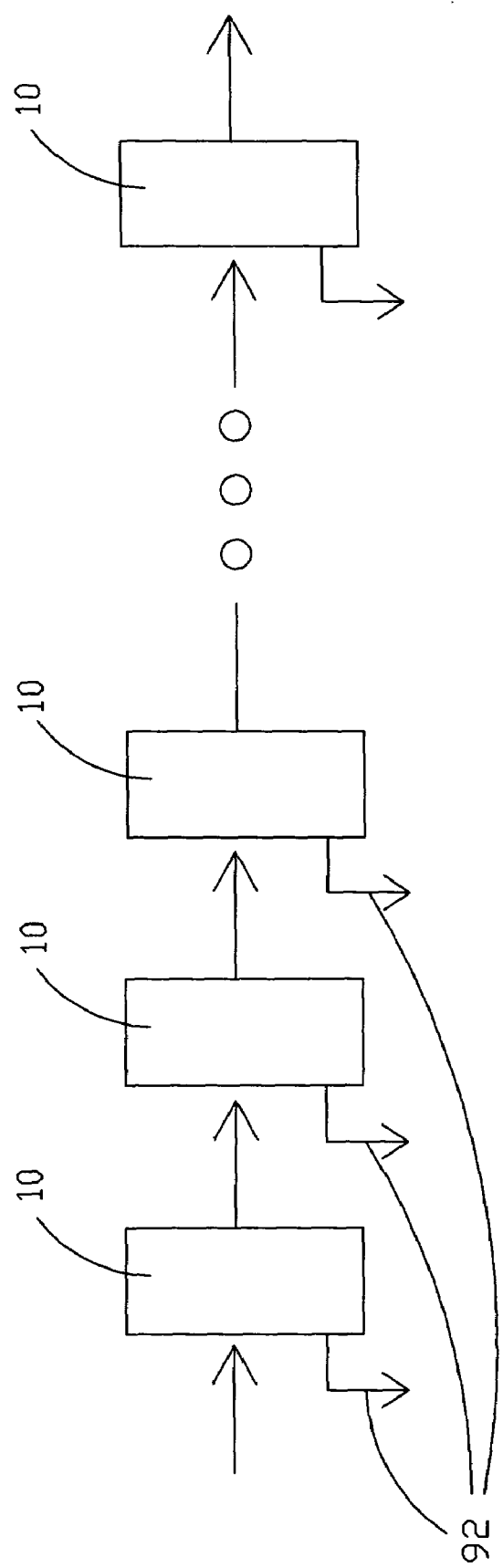
FIG. 20 is a schematical view of a banked system of filters wherein a plurality of filters are interconnected as may be utilized in accord with an embodiment of the invention.

FIG. 20 shows an embodiment of the present where any number N filters may be banked with respect to each other to thereby increase the filtering capacity. The clean water output of the first filter is simply connected to the pond water input of the next filter and so forth. Waste outlets 92 come out of each filter and may be manifolded together or simply drain to the field, grass, drain, or garden as desired. The washing cycle may be produced in all banked filters 10 simultaneously or different controllers may be utilized to provide washing.

If desired, the filtered water from the first filter 10 may be utilized to wash the remaining filters. A valve may be utilized to turn on one of the other filters to provide clean water for washing the first filter. It is desirable to utilize clean water for washing to avoid plugging spray head 12.

Figure 19:
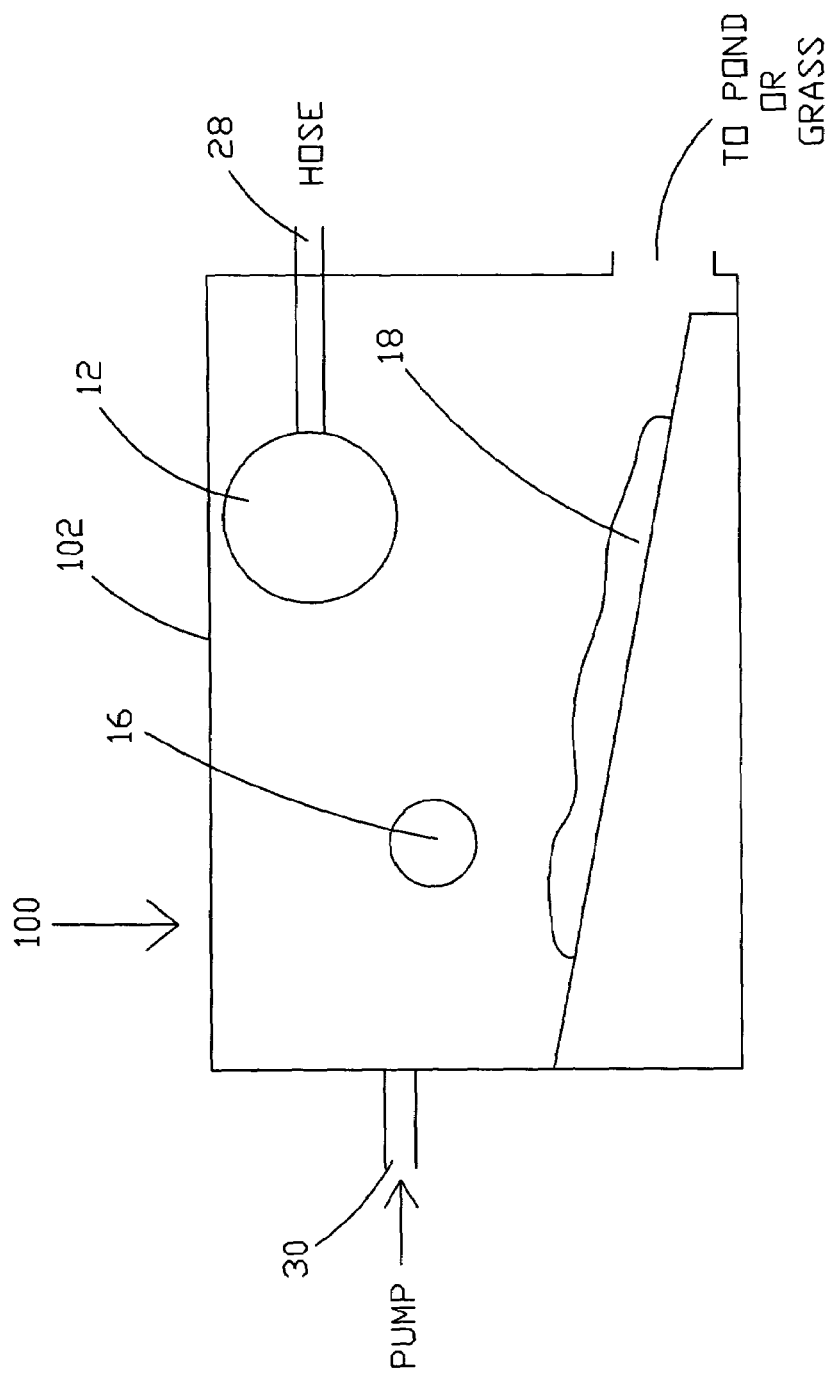
FIG. 19 is an elevational schematical of a hand-held filter that may be cleaned without opening the housing by simply disconnecting from the water circulation system and attaching to a hose for self-cleaning in accord with the present invention.

FIG. 19 discloses another hand-held embodiment 100 of the invention that does not require a diverter or valves. In this embodiment, the entire hand-held filter assembly is simply taken to the hose, or the hose brought to the filter, the filter is disconnected, if necessary from the filtered water outlet and directed to the grass. Cleaning automatically begins once the hose pressure is connected so that spray head 12 operates in the same manner as described hereinbefore. However, because the outlet is simply moved by hand from the pond to the grass or drain, there is no need for a diverter or valves. This method does require some manual intervention but there is normally no need to open the filter housing 102 and remove a dirty filter 18, as required by prior art filters. Instead, after a few minutes of washing, hand-held filter 100 can be replaced in the system. This embodiment may be useful for low-cost applications.

Figure 17A:
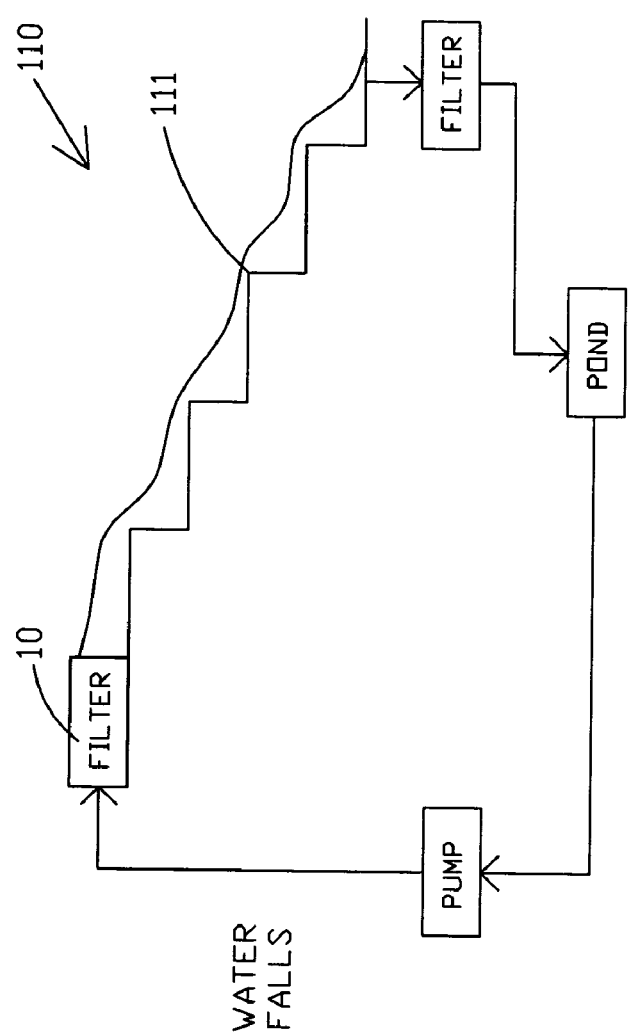
FIG. 17A is a schematical view showing two possible filter placement positions for a waterfall in accord with another possible embodiment of the invention.
Figure 17B:
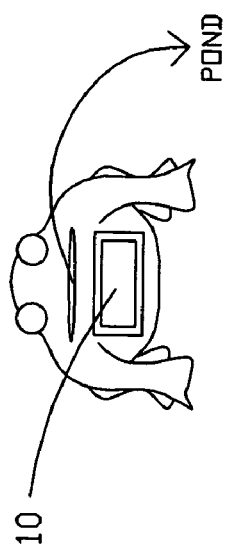
FIG. 17B is a schematical view showing filter placement within a fountain in accord with another possible embodiment of the invention.

FIG. 17A and FIG. 17B disclose possible placements of filter 10 in various circulation systems. For instance, in waterfall system 110, filter 10 may be placed either at the top of the water fall 111 or the bottom of waterfall 111 as desired. Other positioning possibilities for the various types of waterfalls and other water circulation systems are also possible depending on the particular construction thereof. FIG. 17B discloses use of filter 10 within an ornamental device such as a statue, bear, alligator, or the like wherein the filter is positioned therewithin.

Figure 9:
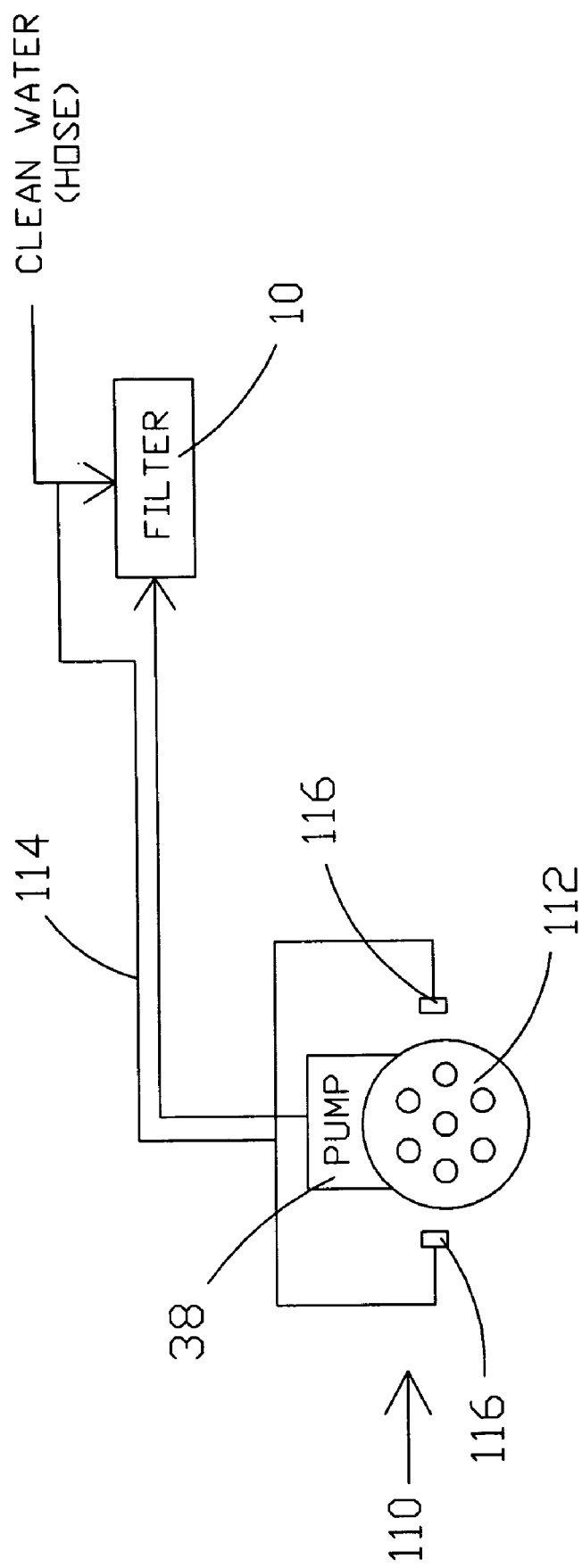
FIG. 9 is a schematical showing one possible embodiment of a pump intake cleaning arrangement in accord with the present invention.

While self-cleaning filter 10 and the various embodiments thereof has been described in some detail hereinbefore, the present invention also comprises a self-cleaning pump intake system 110 for self-cleaning of pump intake 112 as shown, for instance, in FIG. 9.

FIG. 9 discloses self-cleaning pump water intake 112 which operates in conjunction with hose pressure for cleaning pump intake 112 at the same time filter 10 is cleaned. Prior art pumps have a tendency to fail due to a clogged pump intake resulting in expense and loss of fish. Typically, little force is required to clear intake 112 of any debris such as leaves. Thus, calling a service person to fix the pump may take only a second to agitate the water at the pump inlet. The subsequently discussed self-cleaning pump embodiments show various means for effecting a simple cleaning of this type. In FIG. 9, dual hose 114 is preferably utilized although two separate hoses could also be utilized. One of the dual hoses is utilized by pump 38 to pump water to filter 10 for cleaning as discussed above. Whenever water pressure is applied to the hose, the other of the dual hoses is utilized to produce a spray with one or more nozzles 116 that spray fluid over intake 112.

Figure 10B:
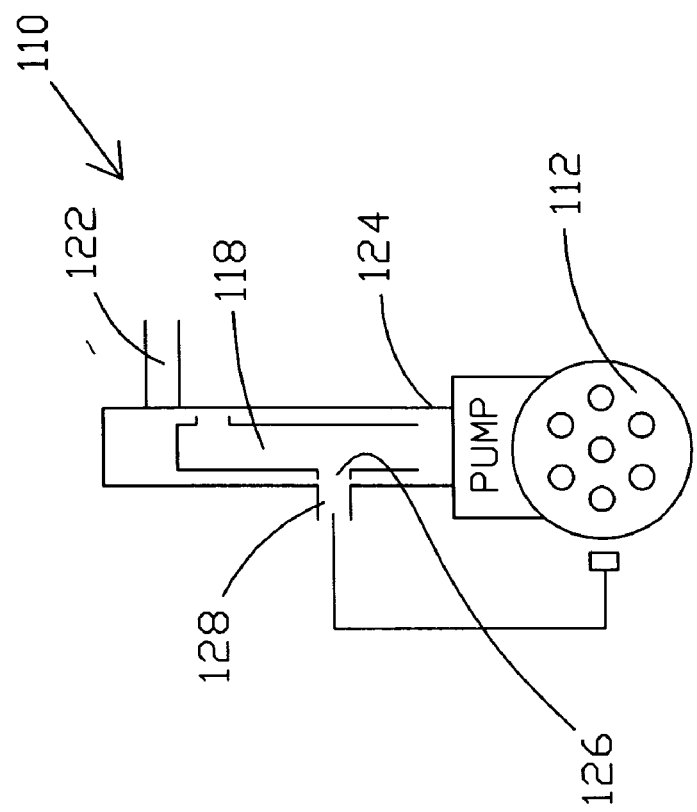
FIG. 10B is a schematical view showing the embodiment of FIG. 10A of a pump intake cleaning arrangement when pump pressure is low in accord with the present invention.
Figure 10A:
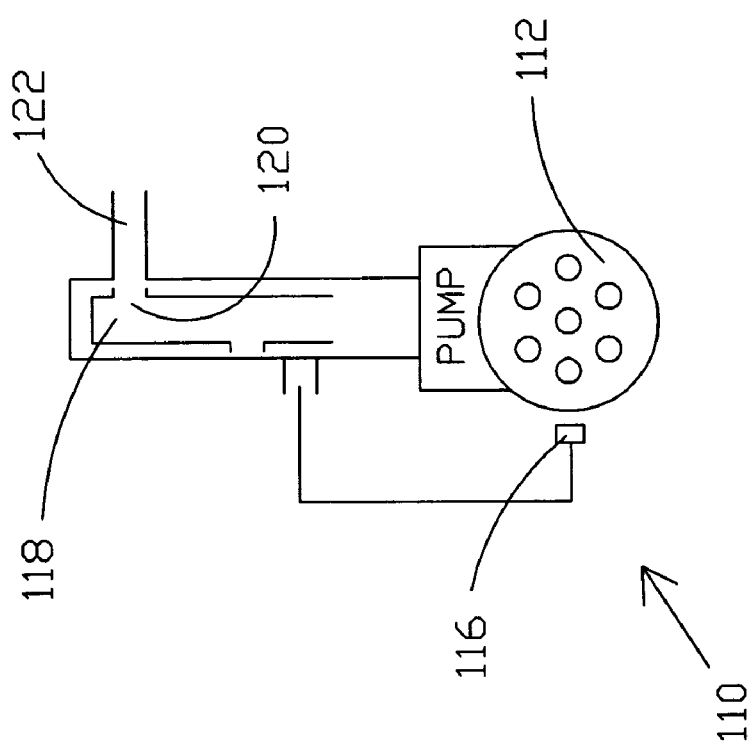
FIG. 10A is a schematical view showing another embodiment of a pump intake cleaning arrangement when pump pressure is normal in accord with the present invention.

FIG. 10A–FIG. 10F show various embodiments for a self cleaning pump intake system 110 for pump intake 112 in accord with the present invention. In FIG. 10A and FIG. 10B a metal free weighted piston 118 acts as a valve for diverting fluid from one path to another. While the following examples are discussed in relationship to pump intake 112, it will be understood that the diverters could also be utilized with various possible embodiments of a self-cleaning filter 10 as discussed hereinbefore for directing filtered fluid to the pond or directing waste fluid from cleaning the filter to a waste fluid outlet. Thus, a diverter for a self cleaning filter may comprise a piston/cylinder with outlets in the cylinder utilized to direct fluid as desired depending on the relative position of the piston, which may be a weighted or buoyant piston.

However, when weighted piston 118 is utilized with pump intake 112, during normal operation when the pump produces normal water pressure, weighted piston 118 is pushed upwardly thereby aligning opening 120 in the upper portion of piston 118 with outlet 122 that leads to the filter. In this case, all fluid flow is directed to the filter as discussed above. However, if pump intake 112 becomes partially clogged and pump pressure is decreased, then the pump pressure is no longer strong enough to force piston 118 upwards and the piston moves downwardly as indicated in FIG. 10B until piston 118 engages stop 124. In this case, opening 126 in the side of piston 118 is aligned with outlet 128. Outlet 122 is blocked because piston 118 is closed at the top. Therefore, pump fluid flows to nozzle 116 at this time for washing intake 112. When intake 112 is clean, the pump pressure increases and operation continues normally as shown in FIG. 10A.

Figure 10D:
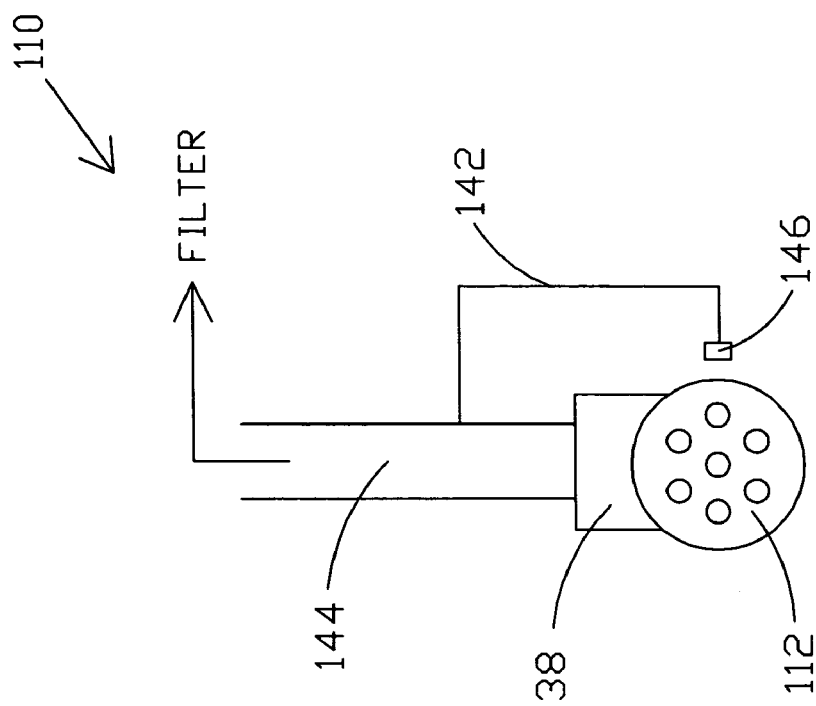
FIG. 10D is a schematical view showing another embodiment of the present invention wherein the piston arrangement of FIG. 10A is substituted for a continuously acting nozzle with a direct line from the pump output in accord with the present invention.
Figure 10C:
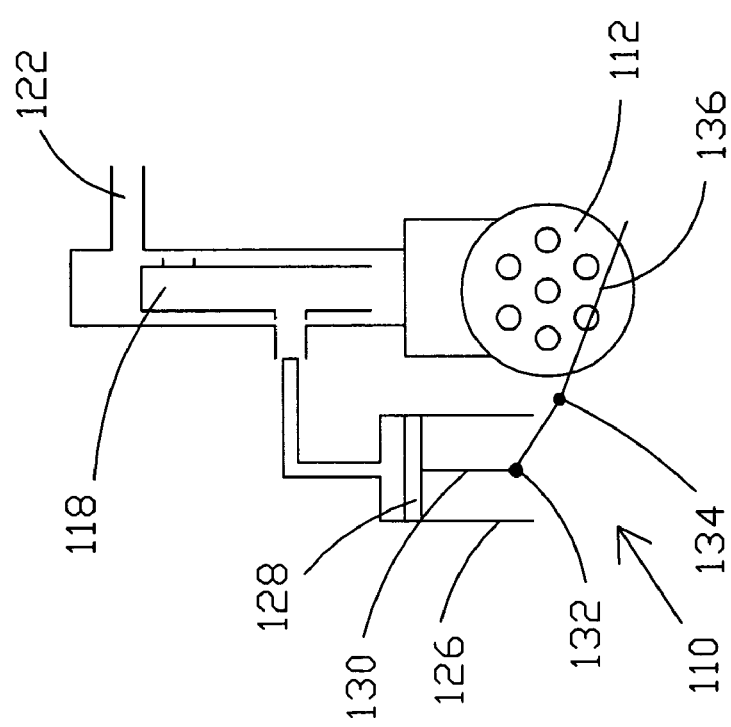
FIG. 10C is a schematical view showing the embodiment of FIG. 10A of a pump intake cleaning arrangement when pump pressure is low utilizing a cylinder-wiper mechanism in accord with the present invention.

In FIG. 10C, the operation is the same, except when pump pressure drops the fluid is directed to a cylinder 126 that contains buoyant piston 128. Buoyant piston 128 is moved downwardly to thereby push shaft 130 which is pivotally connected by pivots 132 and 134 to wiper blade 136. As wiper blade 136 moves across intake 112, the debris is cleaned off the intake. FIG. 10G shows another embodiment wherein pump pressure normally flows to filter 10 as discussed above. Another line goes to buoyant piston 138 in cylinder 140. Pressure in cylinder 140 holds piston 138 in the extended position shown. A drop or shut off of pump pressure due to a blocked intake causes the pressure in cylinder 140 to drop thereby permitting buoyant piston 138 to rise and move wiper blade 136 to thereby clear the blockage.

FIG. 10D shows a line that goes off from the outlet 144 of pump 38 to the filter. A cleaning line 142 comes off the outlet 144. A flexible cleaning tube 146 is attached to the end of cleaning line 142. Fluid flowing through flexible cleaning tube 146 causes flexible cleaning tube 146 to flap around thereby keeping pump input 112 brushed off.

FIG. 10E shows pressure sensitive switch 148 which shuts off the power to pump 38 if the pressure drops. This system may provide a warning that the pump has quit so that the pump can be cleaned.

FIG. 10F provides another embodiment of an automatically self-cleaning pump intake. In this embodiment fluid normally flows through pump outlet 144. When pump inlet 112 is blocked, then a suction or vacuum is created in alternate pump inlet pipe 150. This suction pulls floating ball or piston 152 downwardly to permit fluid flow into inlet screen 154 and into pump 38. If desired, the movement of piston 152 downwardly can open gate 156 of gate valve 158 thereby causing fluid flow or water pressure to enter cleaning tube 160. Cleaning tube 160 may comprise a nozzle for cleaning, or a piston with cleaning blade attached thereto as discussed above, or a flexible cleaning tube that flaps around. Thus, blockage is cleaned off and an extra intake opens to permit fluid flow so that fluid continues to flow through the pump at all times. Once the blockage is cleared, then vacuum is lost and floating ball or cylinder 152 rises to close secondary input intake 154 and stop cleaning action produced by fluid flow and/or fluid pressure in cleaning tube 160.

It will be seen that numerous different mechanisms are shown which can be utilized for cleaning input 112 of pump 38 in accord with the present invention. The cleaning methods may utilize pump flow and/or hose pressure.

Figure 11:
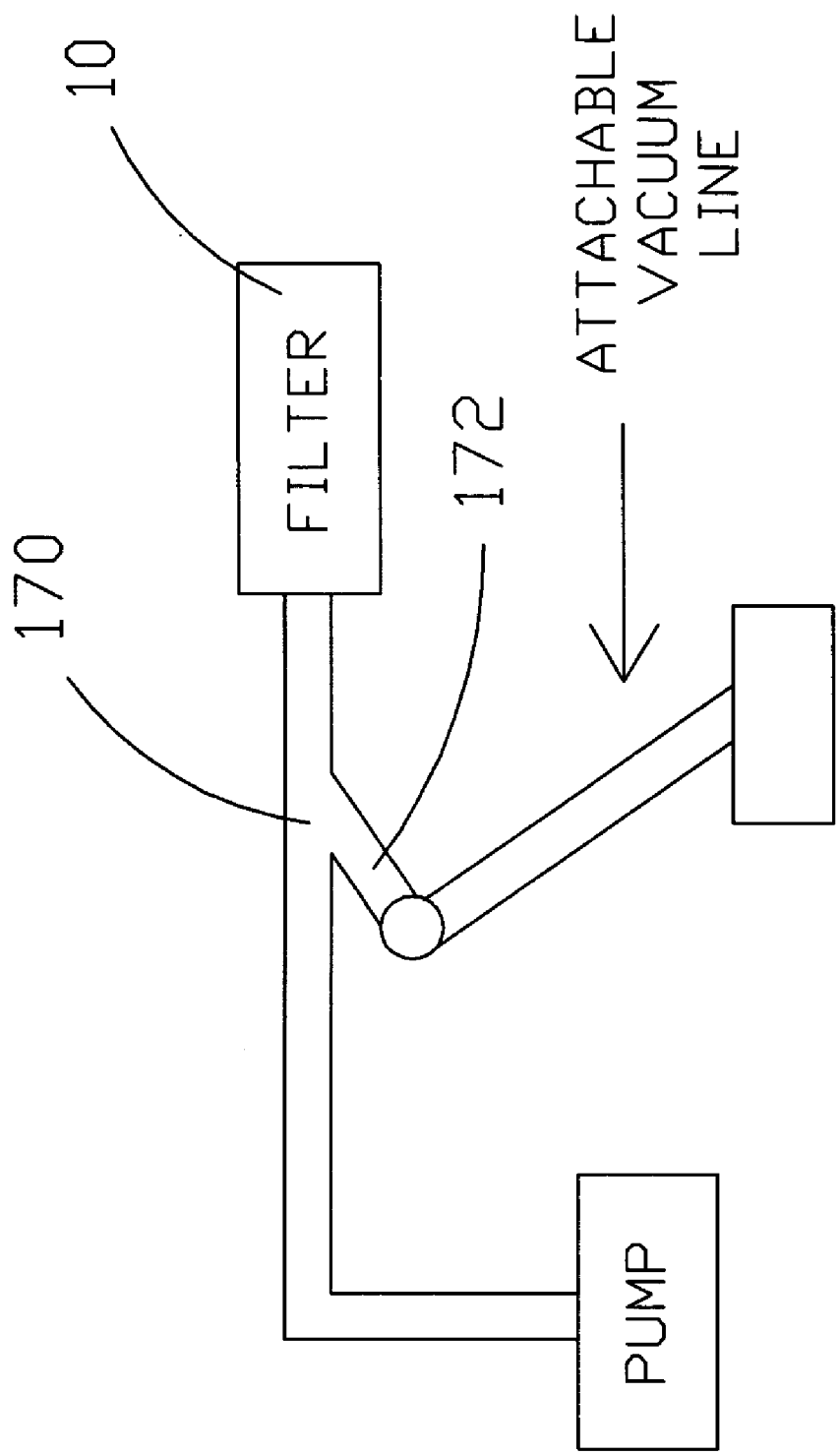
FIG. 11 is a schematical view of a pond cleaning attachment system in accord with the present invention.

FIG. 11 discloses another component of the present invention that may be useful for cleaning the tank or pond. Y-connector 170 is provided. Arm 172 is normally capped. However, when desired, a vacuum line and vacuum head may be attached thereto to thereby permit vacuuming of the fish tank. The water so vacuumed up goes into filter 10.

In summary of operation a preferred embodiment of filter system 10, water director or tray 22 is weighted/fulcrum mounted so that filter water director or tray 22 inclines toward filtered water outlet 32 to the pond for normal filtering. Thus, the pump pumps pond water through diffuser 16 which spreads the fluid over filter media 18 for filtering and subsequent drainage of the filtered water through outlet 32. Upon application of hose pressure to start a filter washing cycle, water piston 14 is activated by water pressure to rotate or tilt filter water director or tray 22 towards waste water outlet 34. A partition beneath pivot point 40 prevents fluid flow between outlet 32 and 34, so that by tilting filter water director or tray 22 water from the hose to wash the filter goes out waste outlet 34. The hose water pressure not only activates piston 14 to tilt filter water director or tray 22 but also goes into flow head 12 which oscillates and cleans filter media 18 and, if desired, also cleans diffuser 16. The washing cycle stops when the hose pressure is turned off, such as by timer 24. The offset weight of water director or tray 22 on pivot member 40 causes tray 22 to automatically rotate back to the normal filtering position whereby water director or water tray 22 is inclined toward pond outlet 32. The rotation of water director or water tray 22 pushes water piston 14 back to its initial position. Filter medium 18 may be mounted directly on tiltable water tray 22 or may be mounted above water tray 22 in a fixed position. Spray head 12 is mounted above filter medium 18.

While a water filtration system is discussed, other uses may be provided for the present invention. For instance, in cleaning shrimp or fish operations, the diverter of the present invention may be utilized. The fluid operated diverter and/or filter of present invention may also be utilized for cleaning filters or other elements in the oilfield, such as where electrical lines are undesirable.

The foregoing disclosure and description of the invention is therefore illustrative and explanatory of a presently preferred embodiment of the invention and variations thereof, and it will be appreciated by those skilled in the art, that various changes in the design, manufacture, layout, organization, order of operation, means of operation, equipment structures and location, methodology, the use of mechanical equivalents, as well as in the details of the illustrated construction or combinations of features of the various elements may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views. Thus, various changes and alternatives may be utilized that remain within the spirit of the invention. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A self-cleaning filter assembly for use with a source of pressurized cleaning fluid, comprising:

a filter;

a housing with said filter mounted therein, said housing defining an unfiltered inlet for receiving unfiltered fluid to be filtered to produce filtered fluid;

a reciprocally movable cleaning head mounted adjacent said filter and being connected with said source of pressurized cleaning fluid, said reciprocally moveable cleaning head being operable for spraying said pressurized cleaning fluid over a fluid input portion of said filter during a filter cleaning cycle which is activated upon the receipt of said pressurized cleaning fluid at said reciprocally moveable cleaning head and moveably responsive to a flow of said pressurized cleaning fluid to a cleaning water input of said housing, said pressurized cleaning fluid producing waste fluid during said filter cleaning cycle;

one or more outlets in said housing; and further comprising a piston and cylinder connected to a moveable fluid director member, said piston and said cylinder being in fluid communication with said pressurized cleaning fluid and responsive to said pressurized cleaning fluid for relative movement between said piston and said cylinder to thereby move said moveable fluid member to direct waste fluid towards a waste fluid outlet during said cleaning cycle.

2. The self-cleaning filter assembly of claim 1, wherein said housing is small enough to be hand-held, and said pressurized cleaning fluid comprises water from a water hose connectable to said housing to activate said cleaning cycle.

3. The self-cleaning filter system of claim 1, further comprising:
said one or more outlets in said housing comprising a waste fluid outlet and a filtered fluid outlet, and
a pivotally mounted fluid director member disposed in said housing, said pivotally mounted fluid director member being pivotal to selectively direct fluid towards either said waste fluid outlet in said housing or said filtered fluid outlet in said housing while said housing is stationary.

4. The self-cleaning filter system of claim 3, wherein said pivotally mounted fluid director member is biased for directing filtered fluid towards said filtered fluid outlet.

5. The self-cleaning filter system of claim 1, wherein said filter is mounted on said pivotally mounted fluid director member.

6. The self-cleaning filter system of claim 1, wherein said filter is mounted in a fixed position spaced apart from said pivotally mounted fluid director member.

7. The self-cleaning filter system of claim 1, further comprising a controllable waste outlet responsive to said pressurized cleaning fluid, said controllable waste outlet being operable to direct said waste fluid therethrough during said filter cleaning cycle and except for during said cleaning cycle being normally closed;
a controllable filtered output, said controllable filtered output being normally open to permit filtered fluid flow out of said self-cleaning filter assembly, said controllable filtered fluid output being controllable for closing in response to said to said pressurized cleaning fluid.

8. The self-cleaning filter system of claim 7, wherein at least one of said controllable waste outlet and said controllable filtered fluid outlet comprises a fluid-activated valve.

9. The self-cleaning filter system of claim 1, said reciprocally moveable head defining a plurality of rectangular spray outlets.

10. The self-cleaning filter system of claim 1, wherein said reciprocally moveable head is mounted above said filter.

11. A self-cleaning filter assembly for filtering circulated liquid out of a reservoir and back into said reservoir, said self-cleaning filter assembly being connectable with a source of pressurized liquid, comprising:
a filter for filtering liquid to produce filtered liquid which returns to said reservoir;
a housing;
a spray member for spraying said filter and connectable with said source of pressurized liquid for cleaning said filter to produce waste fluid which does not flow back into said reservoir; and
a pivotally mounted liquid director member mounted so as to be pivoted by weight of the filter and activation of said spraying, said pivotally mounted liquid director member being pivotal to a first pivotal position upon activation of said spraying for selectively directing said waste fluid towards a waste liquid outlet while said housing remains stationary, said pivotally mounted liquid director being pivotal to a second pivotal position upon ceasing of said spraying for selectively directing said filtered liquid to a filtered liquid outlet while said housing remains stationary.

12. The self-cleaning filter system of claim 11, wherein said pivotally mounted liquid director member is gravity biased towards at least one of said first pivotal position or said second pivotal position.

13. The self-cleaning filter system of claim 11, further comprising a piston and a cylinder connected to said pivotally mounted liquid director member, said piston and said cylinder being in liquid communication with said pressurized cleaning liquid inlet and responsive to said pressurized cleaning liquid for relative movement between said piston and said cylinder to thereby pivot said pivotally mounted liquid director member to direct waste liquid towards said waste liquid outlet during said cleaning cycle.

14. The self cleaning filter system of claim 11, further comprising:
said housing defining an unfiltered inlet for receiving unfiltered liquid to be filtered, and
a pressurized liquid input for receiving said pressurized liquid for cleaning said filter.

15. The self-cleaning filter system of claim 11, wherein said filter is mounted on said pivotally mounted liquid director member.

16. The self-cleaning filter system of claim 11, wherein said filter is mounted in a fixed position spaced apart from said pivotally mounted liquid director member.

17. The self-cleaning filter system of claim 11, wherein said spray member comprises a moving cleaning head mounted adjacent said filter, said moving cleaning head being operable for spraying said pressurized liquid over a top of said filter during a filter cleaning cycle which is activated upon the receipt of said pressurized liquid by said cleaning head.

18. A self-cleaning filter assembly for use with a controllable source of pressurized fluid and for filtering circulated liquid out of a reservoir and back into said reservoir, said self-cleaning filter assembly comprising:
a filter for filtering fluid to produce filtered fluid, said filter collecting debris during operation comprising waste fluid;
a water deflector member;
a piston and cylinder moveable between a first position and a second position, said piston and said cylinder being in fluid communication with said controllable pressurized fluid and responsive to said controllable pressurized fluid for relative movement of said piston and said cylinder between said first position and said second position, said piston and cylinder and said water deflector member being operatively mounted for directing said filtered fluid to a filtered fluid outlet in said first position and for directing said waste fluid towards a waste fluid outlet in said second position; and
at least one fluid filter washing nozzle in fluid communication with said pressurized fluid operable to direct said pressurized fluid onto said filter for cleaning said filter when said piston and cylinder are in said second position.

19. The self-cleaning filter assembly of claim 18, further comprising a gravity bias for biasing said piston to said first position.

20. The self-cleaning filter assembly of claim 18, wherein said at least one fluid filter washing nozzle and said filter are mounted for relative movement therebetween.

21. The self-cleaning filter assembly of claim 18, further comprising a dispenser mounted above said filter and mechanically connected to said piston for releasing a predetermined amount of chemicals onto said filter.

* * * * *